US008858998B2

(12) United States Patent
Chu et al.

(10) Patent No.: US 8,858,998 B2
(45) Date of Patent: Oct. 14, 2014

(54) THERMORESPONSIVE ARGININE-BASED HYDROGELS AS BIOLOGIC CARRIERS

(75) Inventors: Chih-Chang Chu, Ithaca, NY (US); Hua Song, Fremont, CA (US)

(73) Assignee: Cornell University, Ithaca, NY (US)

( * ) Notice: Subject to any disclaimer, the term of this patent is extended or adjusted under 35 U.S.C. 154(b) by 407 days.

(21) Appl. No.: 12/744,882

(22) PCT Filed: Nov. 26, 2008

(86) PCT No.: PCT/US2008/084934
§ 371 (c)(1),
(2), (4) Date: Sep. 9, 2010

(87) PCT Pub. No.: WO2009/073541
PCT Pub. Date: Jun. 11, 2009

(65) Prior Publication Data
US 2011/0008441 A1  Jan. 13, 2011

Related U.S. Application Data

(60) Provisional application No. 60/991,126, filed on Nov. 29, 2007.

(51) Int. Cl.
| | | |
|---|---|---|
| *A61K 9/10* | (2006.01) | |
| *A61K 38/02* | (2006.01) | |
| *A61K 31/7088* | (2006.01) | |
| *C08G 69/02* | (2006.01) | |
| *C08J 3/075* | (2006.01) | |
| *C08G 69/10* | (2006.01) | |
| *C08G 69/44* | (2006.01) | |
| *C08J 3/24* | (2006.01) | |
| *C08J 3/28* | (2006.01) | |
| *C08L 77/12* | (2006.01) | |

(52) U.S. Cl.
CPC .................. *C08J 3/075* (2013.01); *C08G 69/10* (2013.01); *C08G 69/44* (2013.01); *C08J 3/246* (2013.01); *C08J 3/28* (2013.01); *C08L 77/12* (2013.01); *C08J 2377/12* (2013.01)
USPC .............................. 424/486; 528/310; 514/1.1

(58) Field of Classification Search
USPC .................................. 424/423, 426, 468, 486
See application file for complete search history.

(56) References Cited

U.S. PATENT DOCUMENTS

2004/0156906 A1   8/2004   Ding et al.
2008/0014245 A1*  1/2008   Pacetti et al. ................. 424/426
2009/0029937 A1   1/2009   Chu et al.

OTHER PUBLICATIONS

Missirlis et al., "Amphiphilic Hydrogel Nanoparticles. Preparation, Characterization, and Preliminary Assessment as New Colloidal Drug Carriers". Langmuir 2005: (21); 2605-2613.*
Fried et al., "Chapter 16: Amino Acids" (pp. 1-17), Thin-Layer Chromatography, Revised and Expanded, CRC Press 1999.*
International Searching Authority, Notification of Transmittal of the International Search Report and the Written Opinion of the International Searching Authority, or the Declaration, dated Aug. 26, 2009, 4 pgs. with International Search Report, dated Aug. 26, 2009 (6 pgs.) and Written Opinion of the International Searching Authority. dated Aug. 26, 2009 (7 pgs.).
International Bureau, Patent Cooperation Treaty Office, Notification Concerning Transmittal of International Preliminary Report on Patentability with International Preliminary Report on Patentability, dated Jun. 10, 2010 (9 pgs.).
Guo, Kai et al., Biodegradation of unsaturated poly(ester-amide)s and their hydrogels, Biomaterials 28 (2007), 3284-3294, (11 pgs.).
Choi, Joon Sig, et al., Enhanced transfection efficiency of PAMAM dendrimer by surface modification with L-arginine, Journal of Controlled Release 99 (2004), 445-456, (12 pgs.).
Cellesi, Francesco et al., Materials for Cell Encapsulation via a New Tandem Approach Combining Reverse Thermal Gelation and Covalent Crosslinking, Macromol Chemistry and Physics, (2002), vol. 203, 1466-1472, (7 pgs.).
Cruise, Gregory M., et al., Characterization of permeability and network structure of interfacially photopolymerized poly(ethylene glycol) diacrylate hydrogels, Biomaterials 19, (1998), 1287-1294, (8 pgs.).
Guo, Kai, et al., Synthesis and Characterization of Novel Biodegradable Unsaturated Poly(ester amide)/Poly(ethylene glycol) Diacrylate Hydrogels, Journal of Polymer Science: Part A: Polymer Chemistry, (2005), vol. 43, 3932-3944, (13 pgs.).
Missirlis, D., et al., Thermally-induced glass formation from hydrogel nanoparticles, Soft Matter, (2006), vol. 2, 1067-1075, (9 pgs.).
Guo, Kai et al., "Synthesis and Characterization of Novel Biodegradable Unsaturated Poly(esteramides)s" Apr. 1, 2005 Journal of Polymer Science: Part A: Polymer Chemistry, vol. 43 (pp. 1463-1477).
Song, H., L-arginine Based Biodegradable Poly(Ester amide)s, Their Synthesis, Characterization, Fabrications, and Applications as Drug and Gene Carriers, Aug. 2007, Dissertation, pp. 1-158.
Yamanouchi, D., et al., Biodegradable arginine-based poly(ester-amide)s as non-viral gene delivery reagents, Biomaterials, Aug. 1, 2008, vol. 29, No. 22, pp. 3269-3277.

* cited by examiner

*Primary Examiner* — Walter Webb
(74) *Attorney, Agent, or Firm* — Hodgson Russ LLP

(57) ABSTRACT

Cationic poly(ester amide) (PEA)-based hydrogels are provided. The hydrogels are fabricated from unsaturated L-arginine base poly(ester-amide) (UArg-PEA) precursors, pluronicDA precursors, or a combination of UArg-PEA and pluronicDA precursors at predetermined precursor composition ratios. PluronicDA/UArg-PEA hybrid hydrogels and pure pluronicDA based hydrogels are thermoresponsive and biodegradable, while pure UArg-PEA base hydrogels are biodegradable but not thermoresponsive. UArg-PEA based, pluronicDA based and hybrid hydrogels can be synthesized from unsaturated arginine-based PEA salts and/or unsaturated pluronic acid polymers. Unsaturated pluronic acid polymers can be synthesized by reacting pluronic acid with acryloylchloride to provided functional vinyl groups at the two chain ends of pluronic acid. The hydrogels can be used to carry and/or release molecules or compounds such as bioactive compounds, and can function as biologic carriers for a variety of biomedical applications.

14 Claims, 23 Drawing Sheets

Formula I

US 8,858,998 B2

THERMORESPONSIVE ARGININE-BASED HYDROGELS AS BIOLOGIC CARRIERS

CROSS-REFERENCE TO RELATED APPLICATIONS

Figure 1:
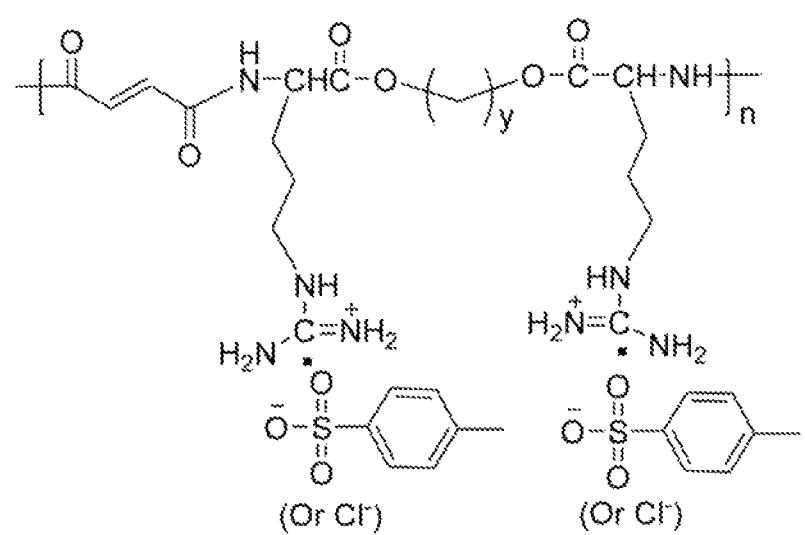

This application is a national stage application under 35 U.S.C. §371 of PCT Application No. PCT/US2008/084934, filed Nov. 26, 2008, which claims priority to and the benefit of U.S. provisional patent application Ser. No. 60/991,126, filed Nov. 29, 2007, which is incorporated herein by reference in its entirety.

STATEMENT REGARDING FEDERALLY SPONSORED RESEARCH OR DEVELOPMENT

The disclosed invention was made with government support under contract no. R01-DE0151.43-01A2 from the National Institutes of Health. The government has rights in this invention.

1. TECHNICAL FIELD

The present invention relates to polyester amide) (PEA)- and pluronic-based hydrogels. The invention further relates to methods for synthesizing poly(ester amide) (PEA)- and pluronic-based hydrogels. The invention also relates to methods for using of poly(ester amide) (PEA)- and pluronic-based hydrogels to carry and/or release bioactive molecules or compounds.

2. BACKGROUND OF THE INVENTION

Hydrogels refer to certain materials that are able to swell under conditions of excess water and hold a large amount of water in the wet state (Ishihara, J. W. Y, K. K. W. N, K., Hydrogels, Encyclopedia of Biomaterials and Biomedical Engineering 2004, 790-801). Hydrogels generally consist of three-dimensional polymer networks that are crosslinked chemically and/or physically. Hydrogels possess sufficient, qualities to be adopted in biomaterials and biomedical engineering practices involving drug delivery carriers, tissue engineering scaffolds, and biomedical devices.

As drag carriers, hydrogels can achieve stimuli-responsive drug release (for example, using pH or temperature) synchronized with enzymatic or nonenzymatic degradation. Widely used medical devices include not only disposable materials, such as syringes, sample bags, and sample tubes, but also artificial organs such as blood vessels. The most promising applications may involve lenses, muscle models, and artificial cartilage. Contact lenses are a major application of hydrogel products due to their transparency, where poly(2-hydroxyethyl methacrylate) (HEMA), the first appearance of a soft biomaterials, was achieved by Otto Wichterle (Wichterle, O.; Lim, D., Hydrophilic Gels for Biological Use, Nature 1960, 185, (4706), 117-118).

It is desirable to release the drag from the gel by shrinkage or swelling on stimulation. Poly(N-isopropyl acrylamide) [poly(NIPAAm)]hydrogel can be used (Schild, H. G., Poly (N-Isopropylacrylamide)—Experiment, Theory and Application. Progress in Polymer Science 1992, 17, (2), 163-249). Poly(NIPAAm) becomes insoluble in water, however, due to dehydration of the polymer chain when the water temperature is over 32° C., which is well known as a lower critical solution temperature (LCST). With this property, the poly(NIPAAm) gel could swell under 32° C. but shrink above 32° C., showing a volume phase transition. Such volume phase transitions are undesirable in hydrogels used for biomedical applications such as hydrogel-based drug delivery systems.

Citation or identification of any reference in Section 2, or in any other section of this application, shall not be considered an admission that such reference is available as prior art to the present invention.

3. SUMMARY OF THE INVENTION

There is therefore a need in the art for biodegradable, biocompatible hydrogels that have semi-reversible thermoresponsive swelling behavior in aqueous solutions over a wide range of temperatures and/or in response to thermal cycling. There is also a need in the art for hydrogels with cationic characteristic that can be used to electrostatically attract anionic biological and/or biochemical species (e.g., anionic growth factors and cytokines, cells for tissue engineering and repair). A family of poly(ester amide) (PEA)-based hydrogels is provided that solves this problem. The PEA-based hydrogels are cationic, biodegradable and exhibit semi-reversible thermoresponsive swelling behavior in aqueous solutions over a wide range of temperatures or in response to thermal cycling. In one embodiment, the hydrogels are based on L-arginine unsaturated poly(ester-amide) ("UArg-PEA" or "Arg-UPEA") polymers. In another embodiment, the hydrogels are based on pluronicDA polymers. In another embodiment, the hydrogels are hybrid hydrogels based on pluronicDA and UArg-PEA polymers. In another embodiment, the pluronicDA based and hybrid hydrogels have thermoresponsive properties. In a specific embodiment, the thermoresponsive property is derived from the pluronicDA component of the hydrogel Polymer precursors for UArg-PEA, pluronicDA, and hybrid hydrogels are also provided.

The invention further provides methods for synthesizing UArg-PEA based hydrogels, pluronicDA based hydrogels and hybrid hydrogels. In one embodiment, the UArg-PEA based hydrogels, pluronicDA based hydrogels and hybrid hydrogels can be fabricated from two water soluble polymers: unsaturated arginine-based PEA salt and/or unsaturated pluronic acid.

In another embodiment, unsaturated pluronic acid can be synthesized by reacting a commercially available pluronic acid with acryloylchloride to provide junctional vinyl groups at the two chain ends of pluronic acid.

The invention also provides methods for using UArg-PEA based hydrogels, pluronicDA based hydrogels and hybrid hydrogels to carry and/or release molecules or compounds. The UArg-PEA based hydrogels, pluronicDA based hydrogels and hybrid hydrogels can be used as biologic carriers for a variety of biomedical applications. The hydrogels provided by the invention can be used to carry and/or release bioactive molecules or compounds including but not limited to nutrients, pharmaceuticals, drugs, peptides, polypeptides, oligonucleotides and polynucleotides.

In a specific embodiment, the invention provides a composition comprising an unsaturated arginine-based poly(ester amide) based (UArg-PEA) polymer having a chemical formula described by general structural formula (I) (FIG. 1), Formula (I)

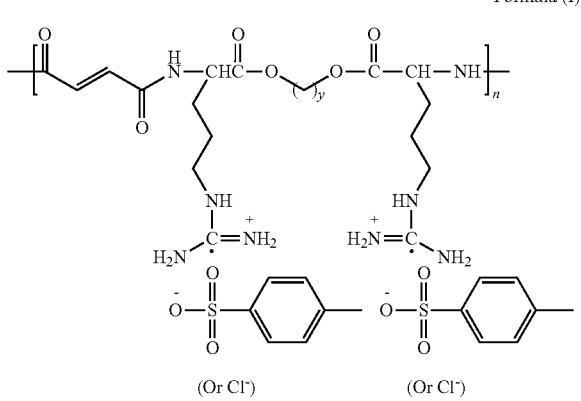

wherein y indicates the number of methylene (—$CH_2$—) groups between two adjacent esters and wherein y=1-20. The subscript n indicates the number of repeat units and can range from about 5 to about 600.

In another embodiment, the invention provides a composition, comprising an unsaturated pluronic diacrylate (pluronicDA) polymer having a chemical formula described by general structural formula (II) (FIG. 2), Formula (II)

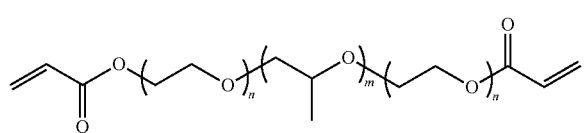

wherein m is the number of polypropylene oxide segments and m=10-90 and n is the number of polyethylene oxide segments and n=1-150.

In another embodiment, the composition comprises:
an unsaturated Arg-PEA (UArg-PEA) polymer having a chemical formula described by general structural formula (I); and
an unsaturated pluronicDA polymer having a chemical formula described by general structural formula (II).

The invention provides a hydrogel based on polymers having a chemical formula described by the general structural formula (I) or (II). The hydrogel can comprise a plurality of crosslinked polymers wherein the polymers, prior to polymerization and crosslinking, have a chemical formula described by the general structural formula (I) or (II). In one embodiment of the hydrogel, the polymers, prior to polymerization and crosslinking, have a chemical formula described by the general structural formula (I). In another embodiment of the hydrogel, the polymers, prior to polymerization and crosslinking, have a chemical formula described by the general structural formula (II). In another embodiment, the hydrogel is a hybrid hydrogel wherein the polymers, prior to polymerization and crosslinking, have a chemical formula described by the general structural formulae (I) and (II). In yet another embodiment, the hydrogel has thermoresponsive properties.

In another embodiment, the invention provides a method for synthesizing an unsaturated pluronicDA polymer comprising reacting pluronic acid with acryloyl chloride wherein functional vinyl groups are provided at the two chain ends of the pluronic acid. The method can comprise: (a) reacting a pluronic acid solution with an acid acceptor (e.g., Methyl amine or DMAP) at a concentration in molar excess of each —OH group on the pluronic acid; and (b) reacting the pluronic acid solution with acryloyl chloride at a concentration in molar excess of each —OH group on the pluronic acid, thereby forming acrylate diesters of pluronic acid (pluronicDA). In another embodiment, the pluronicDA product can be recovered by precipitation.

In another embodiment, the invention provides a method for synthesizing a hydrogel comprising: providing a plurality of unsaturated pluronic diacrylate (pluronicDA) polymers having a chemical formula described by general structural formula (II); and polymerizing and crosslinking the pluronicDA polymers. In a specific embodiment, the method can comprise providing an initiator, wherein, the step of polymerizing and crosslinking the pluronicDA polymers comprises photopolymerizing the pluronicDA polymers in the presence of the initiator.

Figure 22:
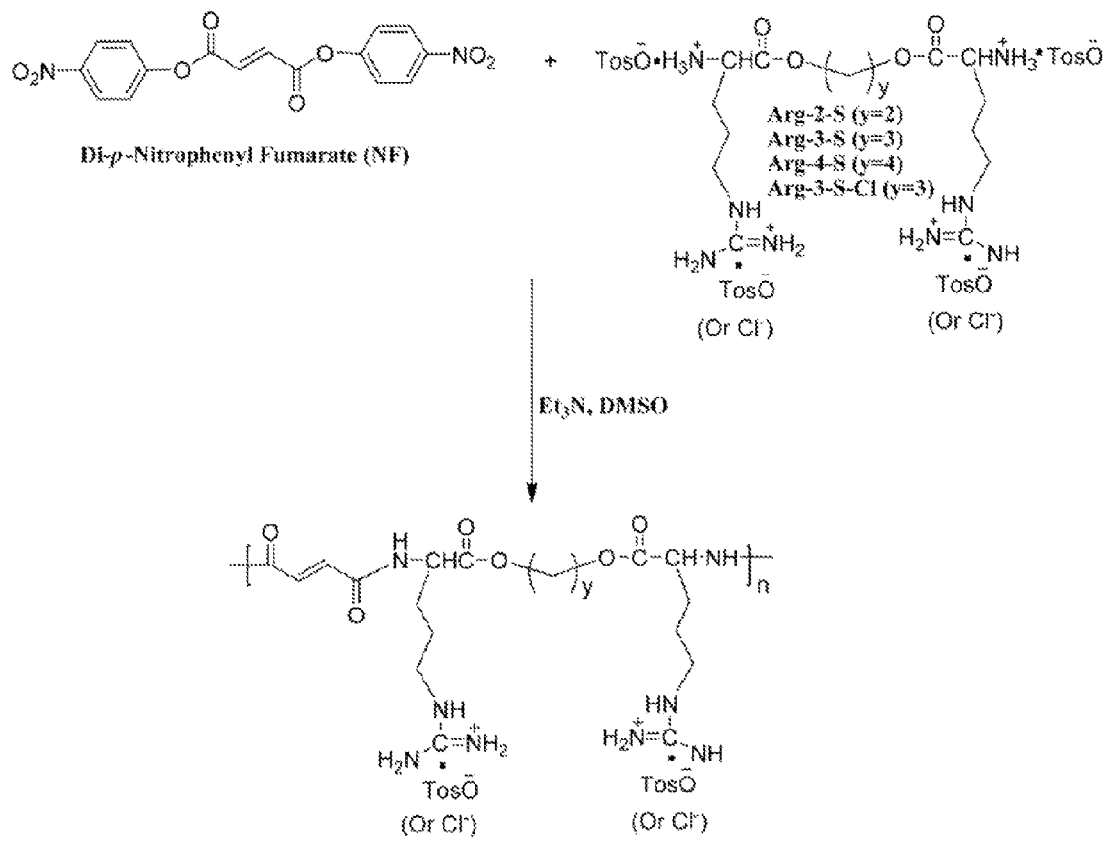

In another embodiment, the invention provides a method for synthesizing a UArg-PEA polymer (FIG. 22). The method can comprise reacting unsaturated type monomer di-p-nitrophenyl fumarate NF and an arginine toluenesulfonic acid (or hydrochloric acid) ester salt with an acid acceptor (e.g., triethylamine ($Et_3N$), 4-dimethylamino-pyridine (DMAP), sodium carbonate or sodium bicarbonate) and with dimethylsulfoxide (DMSO) (or dimethylformamide (DMF) or dimethylacetamide (DMA)) organic solvent. The $Et_3N$, DMAP, sodium carbonate or sodium bicarbonate acts as an acid acceptor during the polycondensation step of synthesizing UArg-PEA.

In another embodiment, the invention provides a method for synthesizing a hydrogel comprising: providing a plurality of UArg-PEA polymers having a chemical formula described by general structural, formula (I); and polymerizing and crosslinking the UArg-PEA polymers. In a specific embodiment, the method can comprise providing an initiator, wherein the step of polymerizing and crosslinking the UArg-PEA polymers comprises photopolymerizing the UArg-PEA polymers in the presence of the initiator.

A method for synthesizing a hybrid hydrogel is also provided. The method can comprise: providing a UArg-PEA polymer having a chemical formula described by general structural formula (I); providing a pluronicDA polymer having a chemical formula described by general structural formula (II); and polymerizing and crosslinking the UArg-PEA and pluronicDA polymers. In a specific embodiment, the method can comprise providing an initiator, wherein the step of polymerizing and crosslinking the UArg-PEA and pluronicDA polymers comprises photopolymerizing the polymers in the presence of the initiator.

In another embodiment, a method for controlling release of a molecule or compound is provided. The method can comprise: providing a hydrogel of the invention, wherein the molecule or compound is loaded in the hydrogel.

The molecule or compound can be a bioactive molecule or compound. In specific embodiments, the molecule or compound can be a nutrient, pharmaceutical, drag, peptide, polypeptide, oligonucleotide or polynucleotide.

A method for directing release of a molecule or compound in an area of interest, is also provided. The method can comprise: providing a hydrogel of the invention, wherein the molecule or compound is loaded in the hydrogel and wherein the hydrogel is inserted in the area of interest.

In another embodiment, an apparatus for controlling release of a molecule or compound is provided.

In another embodiment, an apparatus for directing release of a molecule or compound in an area of interest is provided.

4. BRIEF DESCRIPTION OF THE DRAWINGS

The present invention is described herein with reference to the accompanying drawings, in which similar reference characters denote similar elements throughout the several views. It is to be understood that in some instances, various aspects of the invention may be shown exaggerated or enlarged to facilitate an understanding of the invention.

FIG. 1. Chemical structure of UArg-PEA (Formula I). y indicates the number of methylene (—CH2-) groups in the diol (i.e., dialcohol) segments and can range from 1 to 20. The subscript n indicates the number of repeat units and can range from about 5 to about 600.

Figure 2:
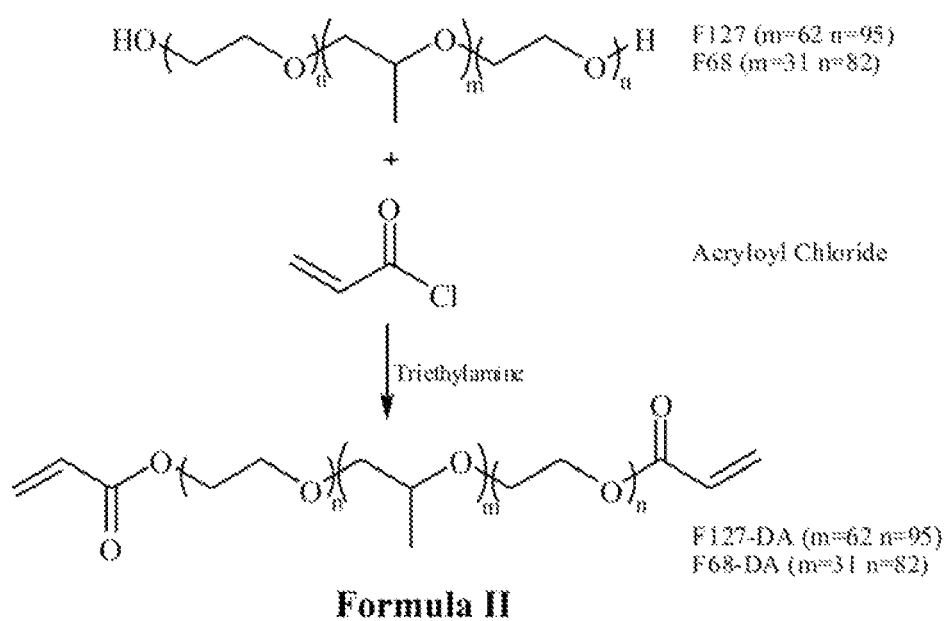

FIG. 2. Synthesis of pluronicDA (Formula II) from pluronic acid, m is the number of polypropylene oxide segments and can range from 10 to 90. n is the number of polyethylene oxide segments and can range from 1 to 150. The synthesis of two specific pluronicDA macromers, F127DA ("F127-DA," m-62 and n-95) and F68DA ("F68-DA," m=31 and n=82), is also indicated.

Figure 3:
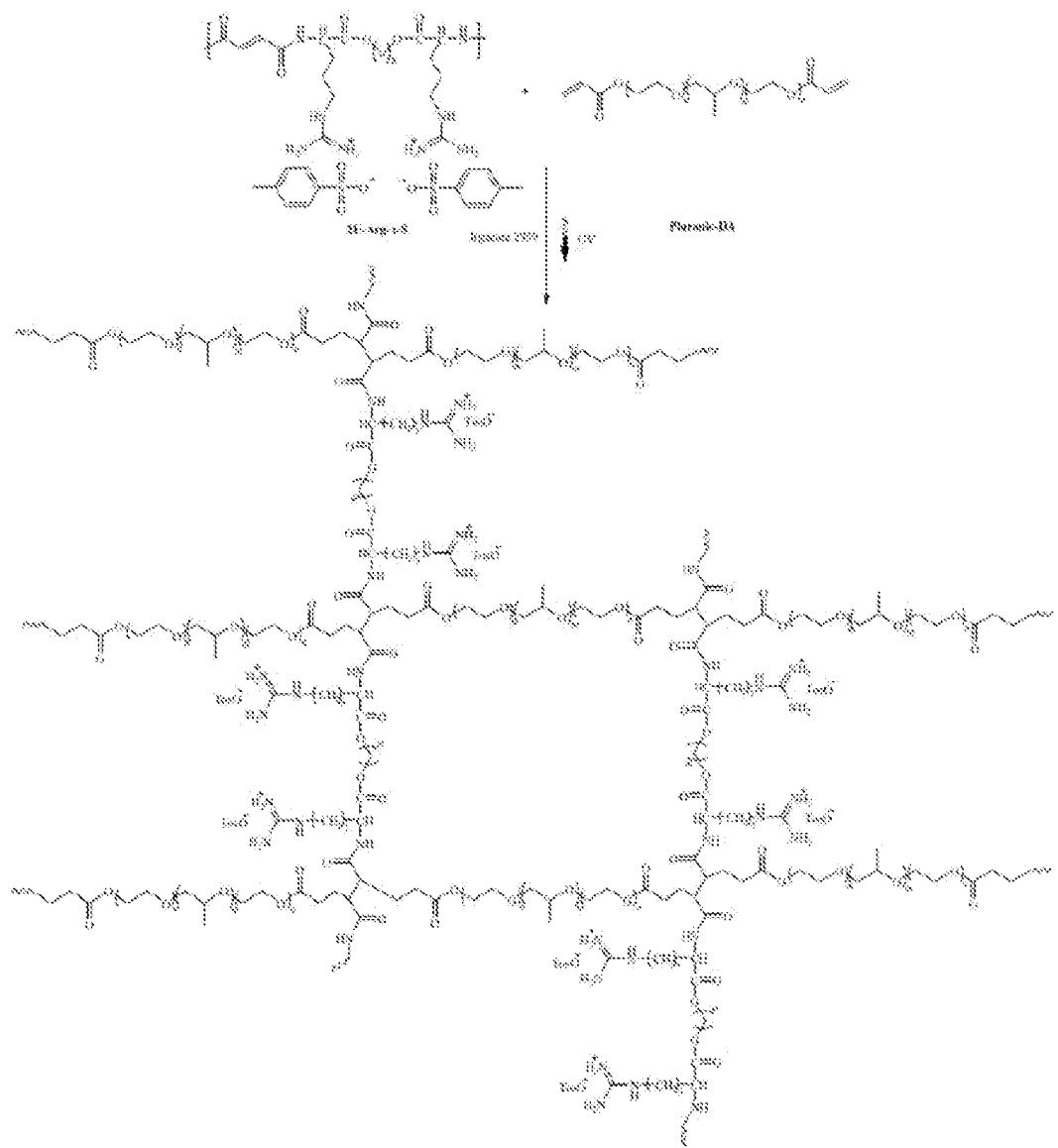

FIG. 3. Scheme for possible UV crosslinking between UArg-PEA and pluronicDA. See Section 6.1 for details.

Figure 4:
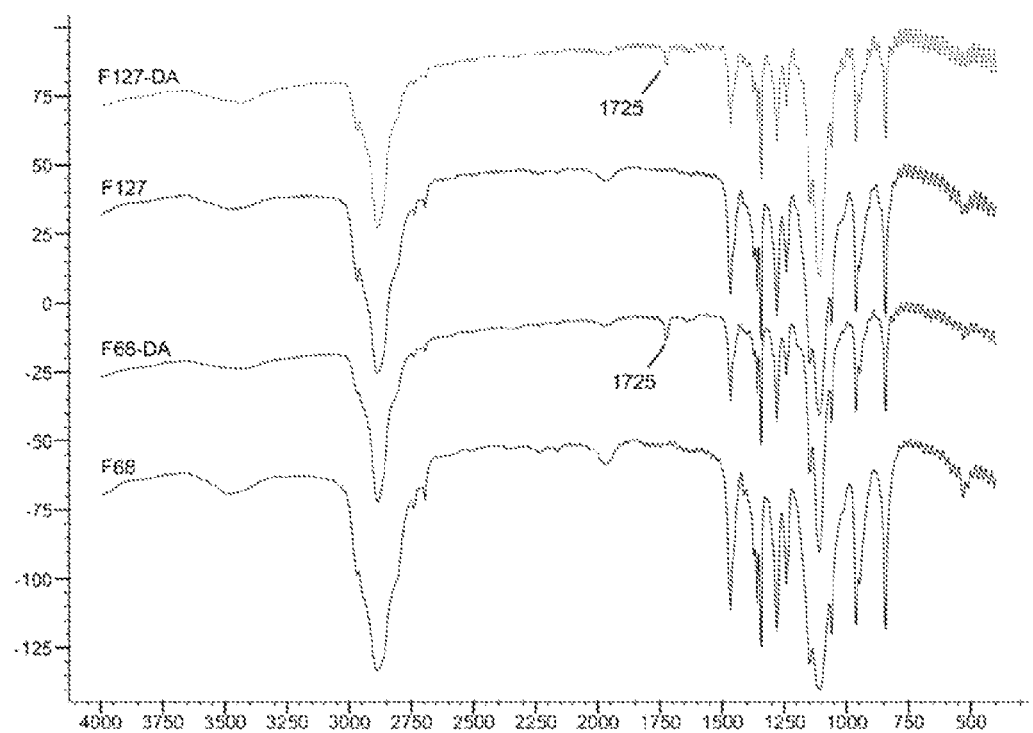

FIG. 4. FUR spectra of F127DA, F127, F68DA and F68. See Section 6.1 for details.

Figure 5:
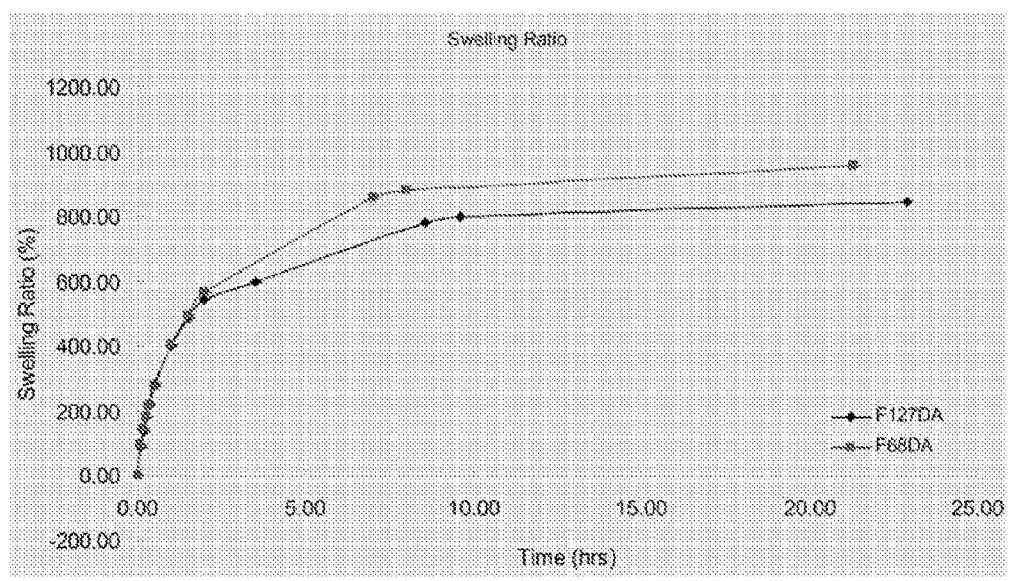

FIG. 5. Swelling behavior of pure pluronicDA hydrogels. See Section 6.1 for details.

Figure 6:
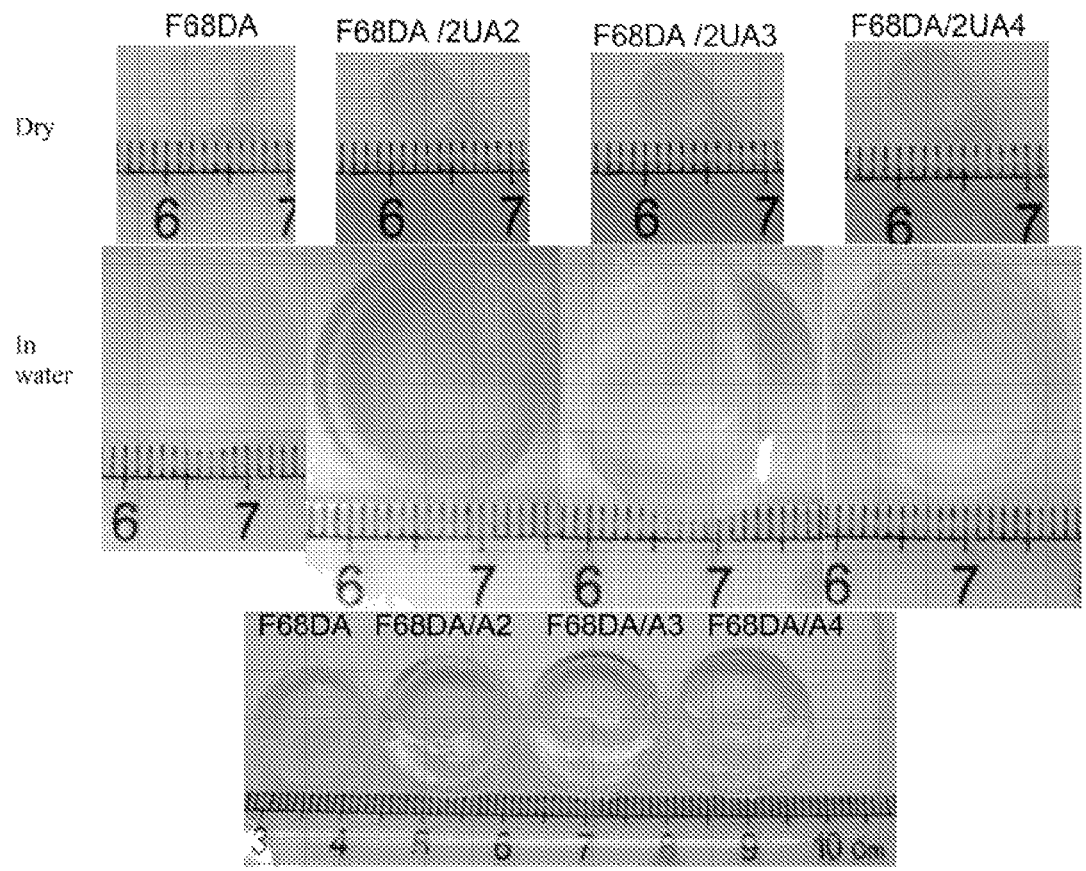

FIG. 6. Photographs of F68DA/UArg-PEA hydrogels under dry and wet conditions, and their size comparison after swollen in water. See Section 6.1 for details.

Figure 7:
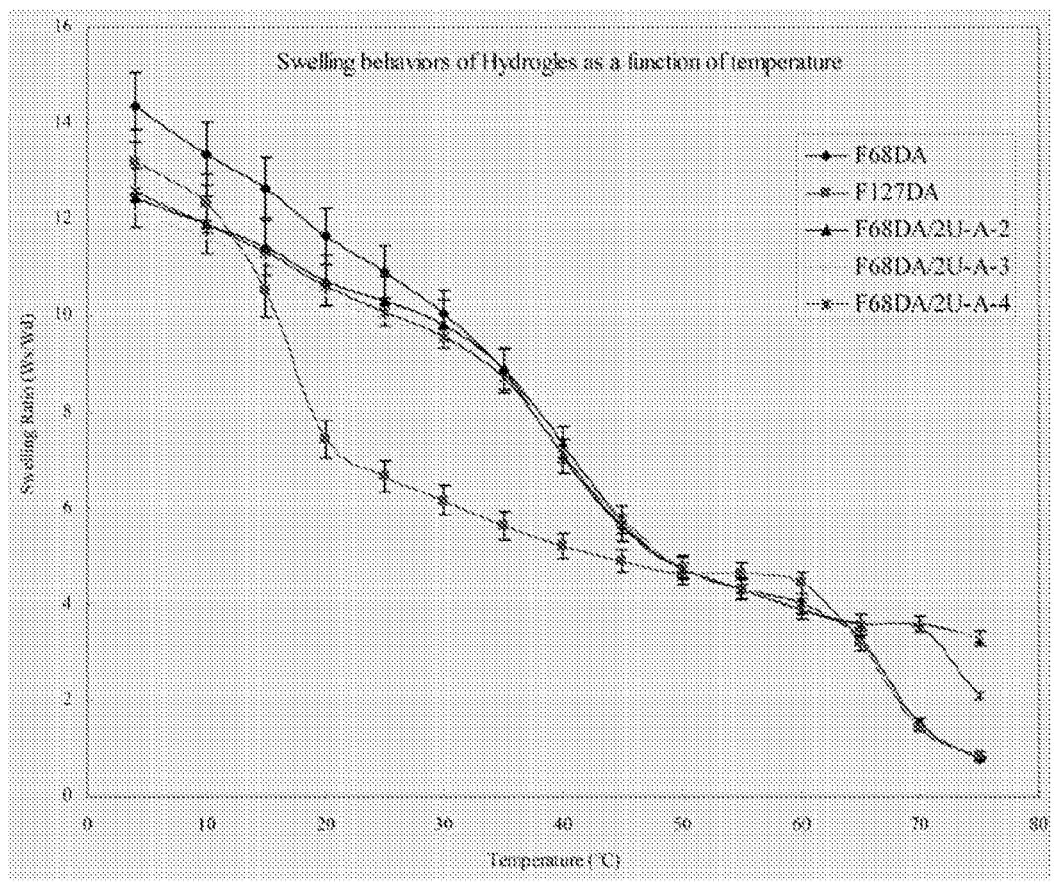

FIG. 7. Swelling behaviors of a series of hydrogels as a function of temperature. See Section 6.1 for details.

Figure 8:
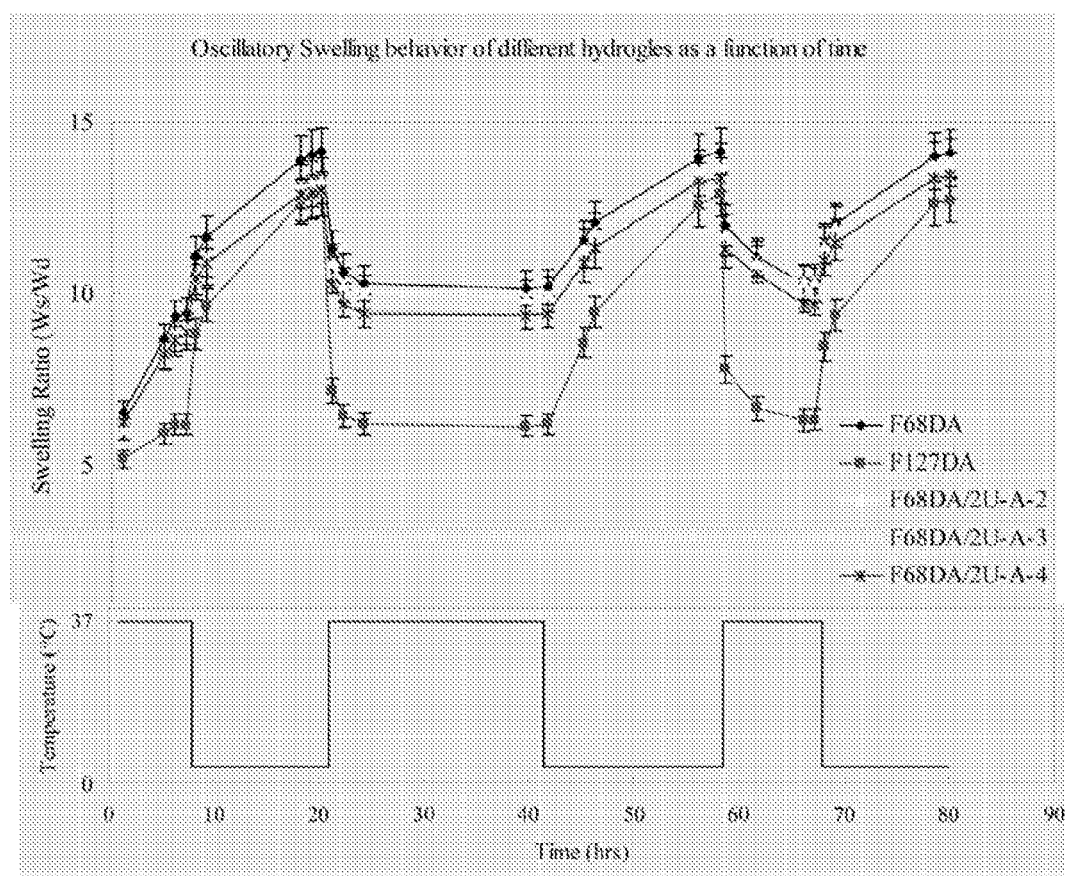

FIG. 8. Oscillatory swelling behaviors of different pluronic hydrogels as a function of temperature. 190/10 w/w of F68DA/2U-Arg-y-S. See Section 6.1 for details.

Figure 9:
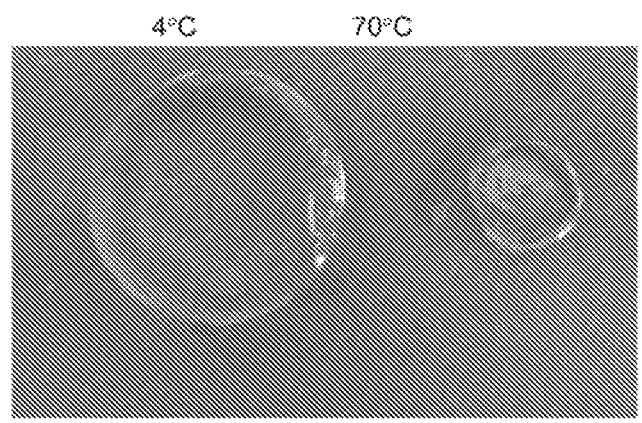

FIG. 9. Photographs of F68DA swelling at two different temperatures. See Section 6.1 for details.

Figure 10:
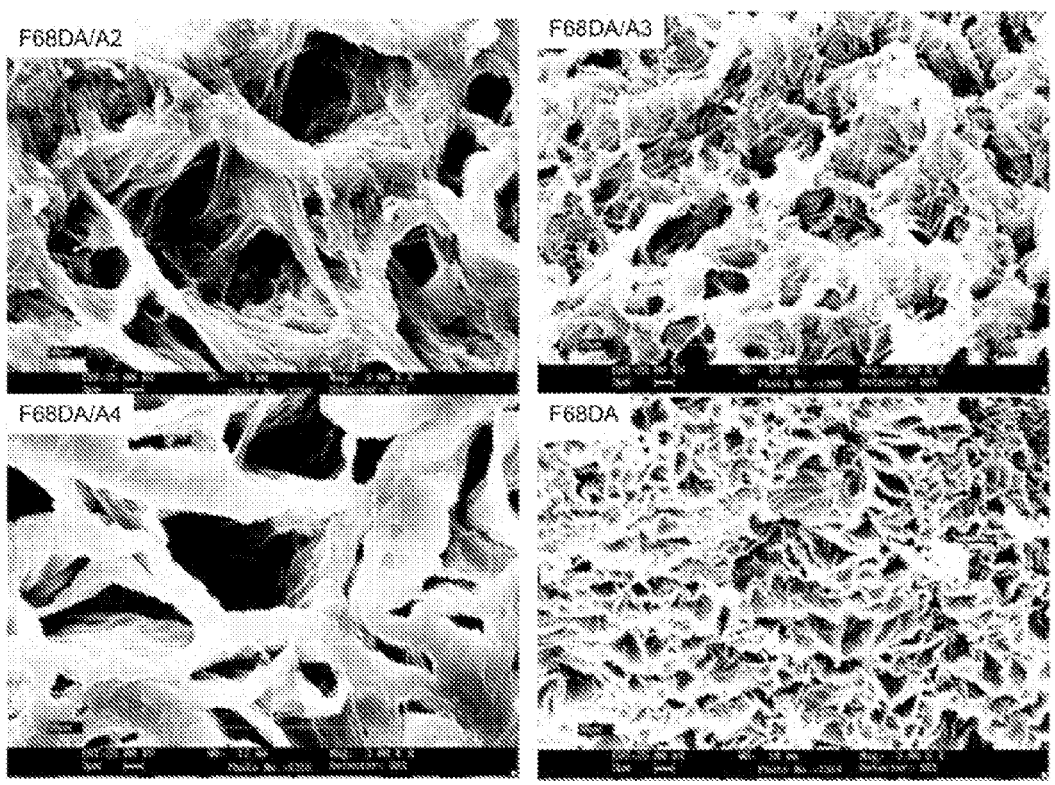

FIG. 10. SEM images of F68DA/UArg-PEA Hydrogels (90/10 w/w). A2, A3 and A4=2U-Arg-2, 3 and 4. Size bar is 3 μm. See Section 6.1 for details.

Figure 11:
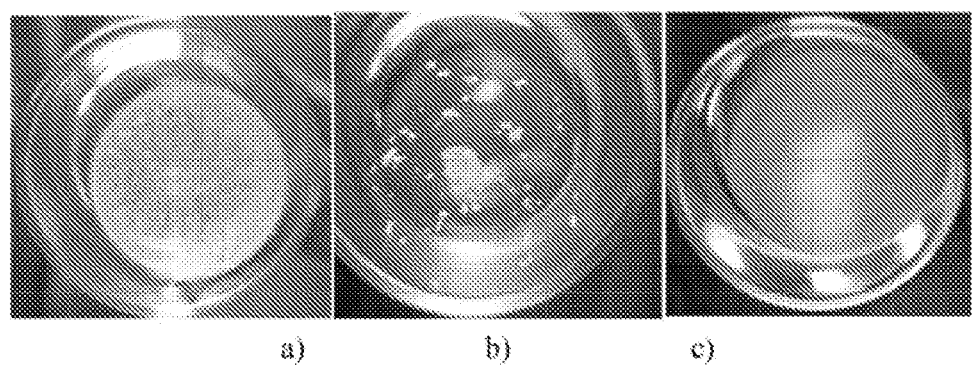

FIG. 11. Photographs of hydrogels loaded with paclitaxel after 7 days. A) F68DA; B) F127DA; C) F68DA/2U-Arg-3-S (90/10). See Section 6.1 for details.

Figure 12:
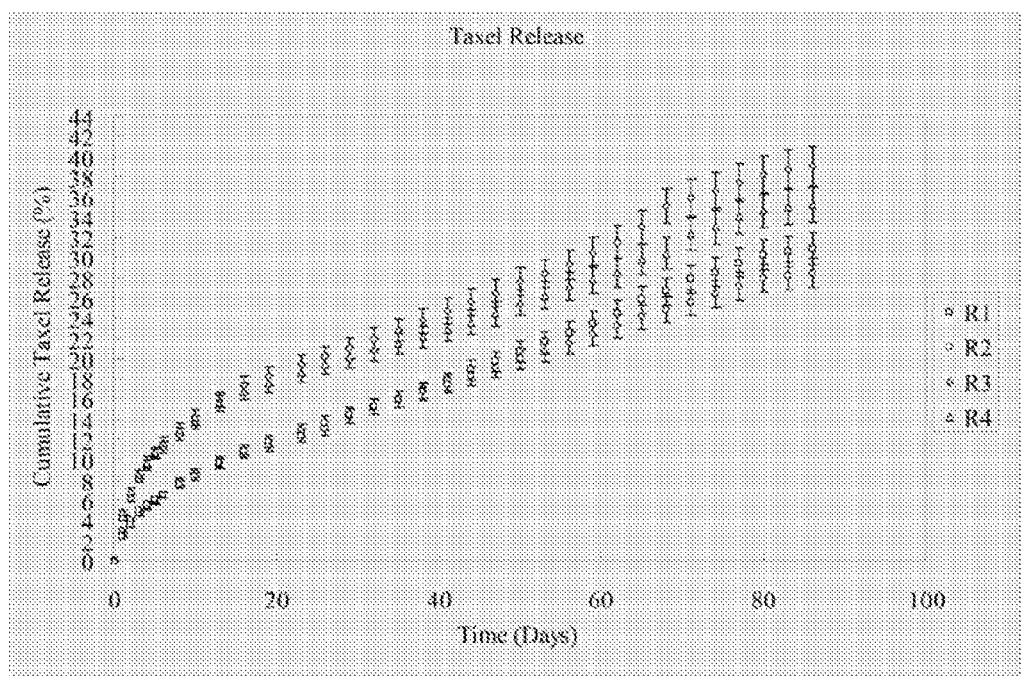

FIG. 12. Taxel release of different hydrogels without trypsin: F68DA/2U-Arg-2. R1-50/50; R2-75/25' R3-90/10; R4-100/0. See Section 6.1 for details.

Figure 13:
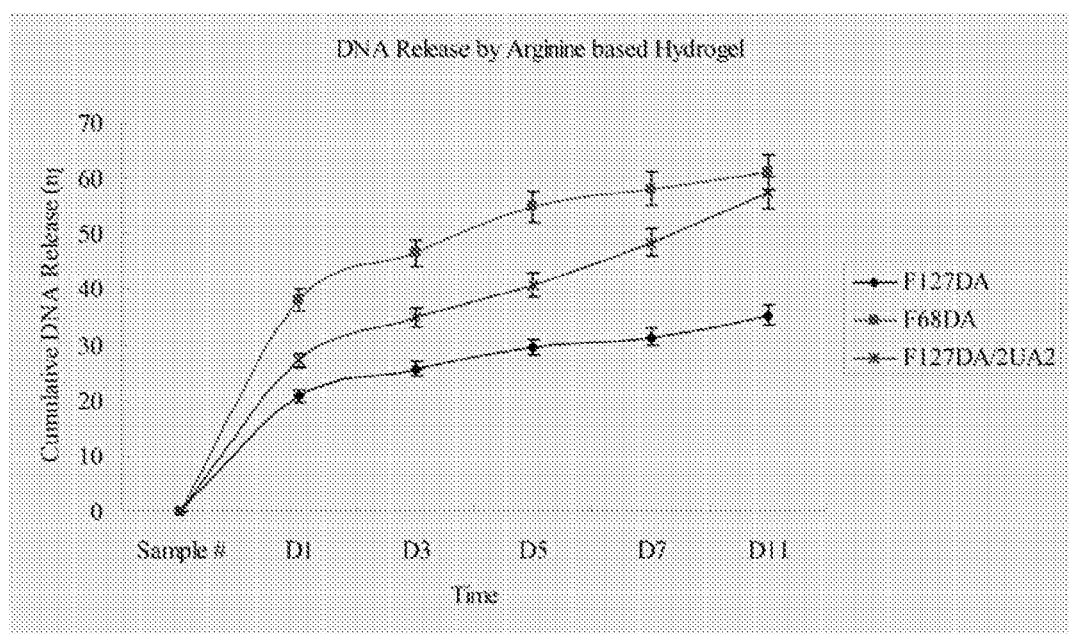

FIG. 13. DNA release by different hydrogels. See Section 6.1 for details.

Figure 14:
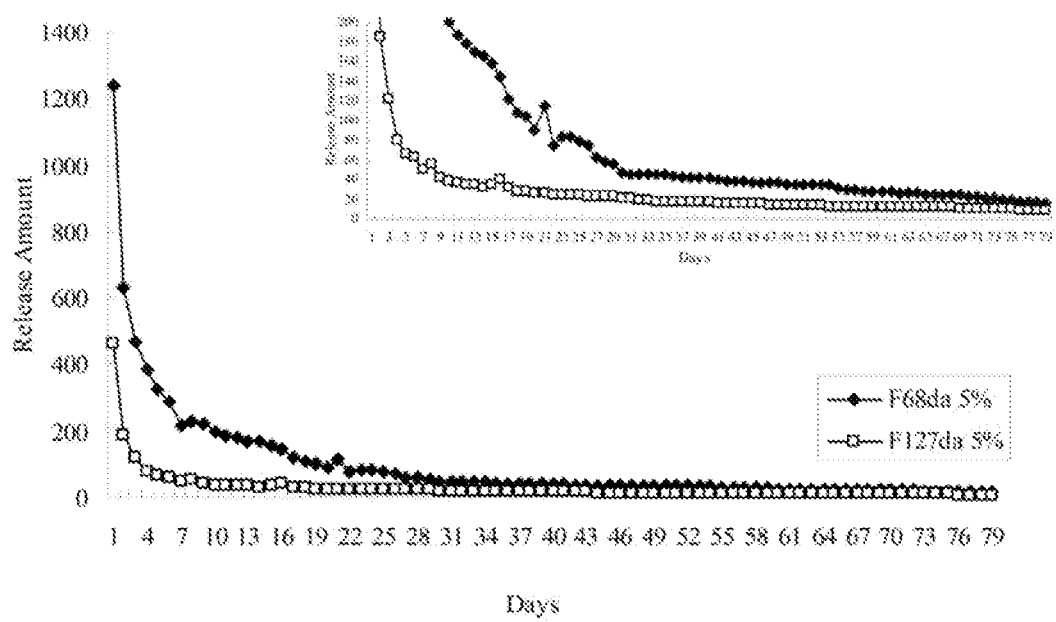

FIG. 14. Effect of hydrophilicity of polymers on the IL-12 release pattern by comparing F68DA and F127DA. See Section 6.2 for details.

Figure 15:
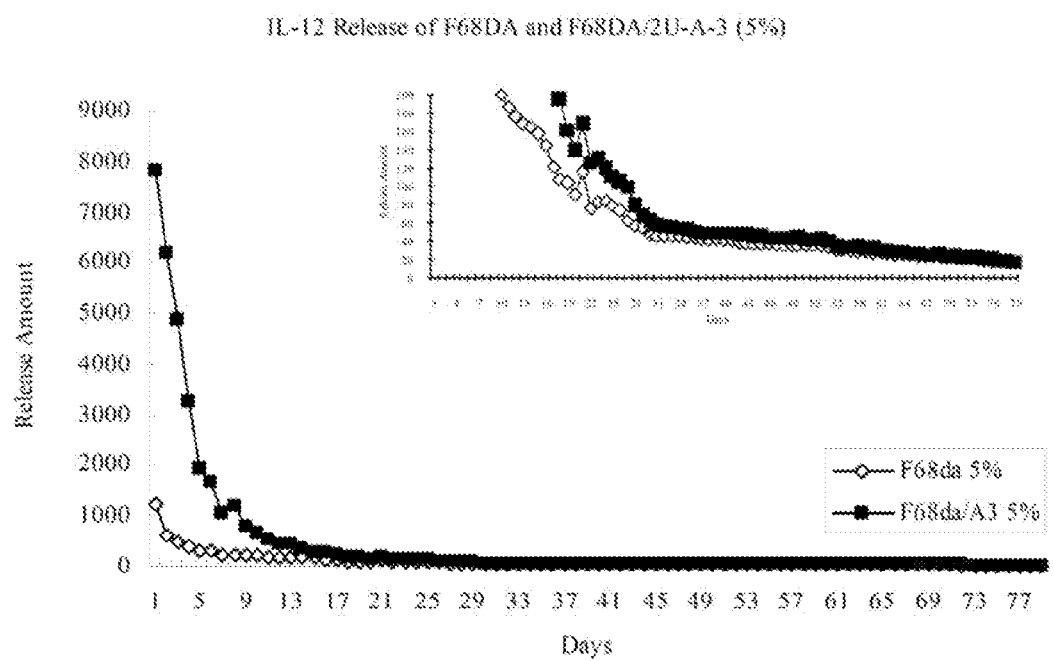

FIG. 15. Effect of hydrophilicity of polymers on the IL-12 release pattern by comparing F68DA and F68DA/2U-A-3 (3/1) with 5% initiator. See Section 6.2 for details.

Figure 16:
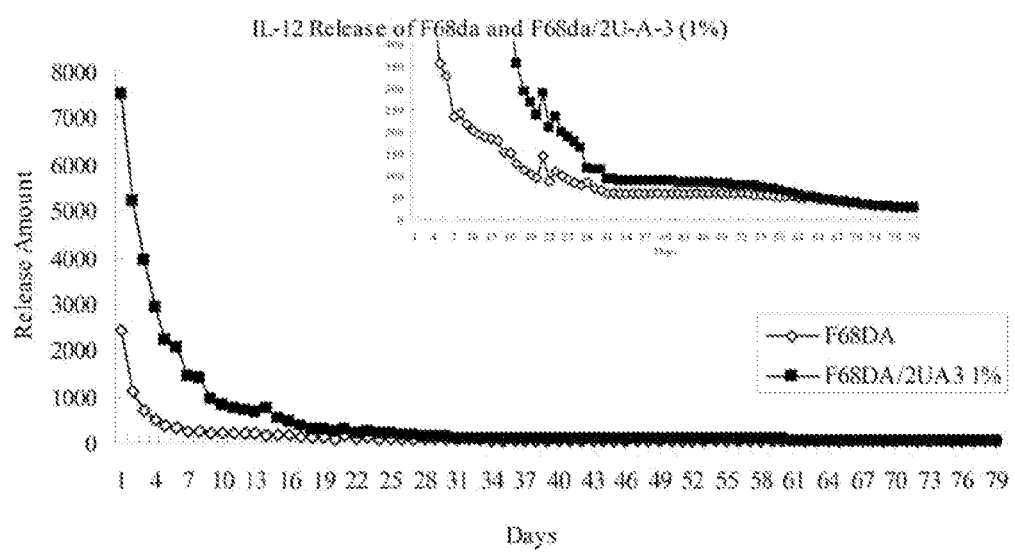

FIG. 16. Effect of hydrophilicity of polymers on the IL-12 release pattern by comparing F68DA and F68DA/2U-A-3 (3/1) with 1% initiator. See Section 6.2 for details.

Figure 17:
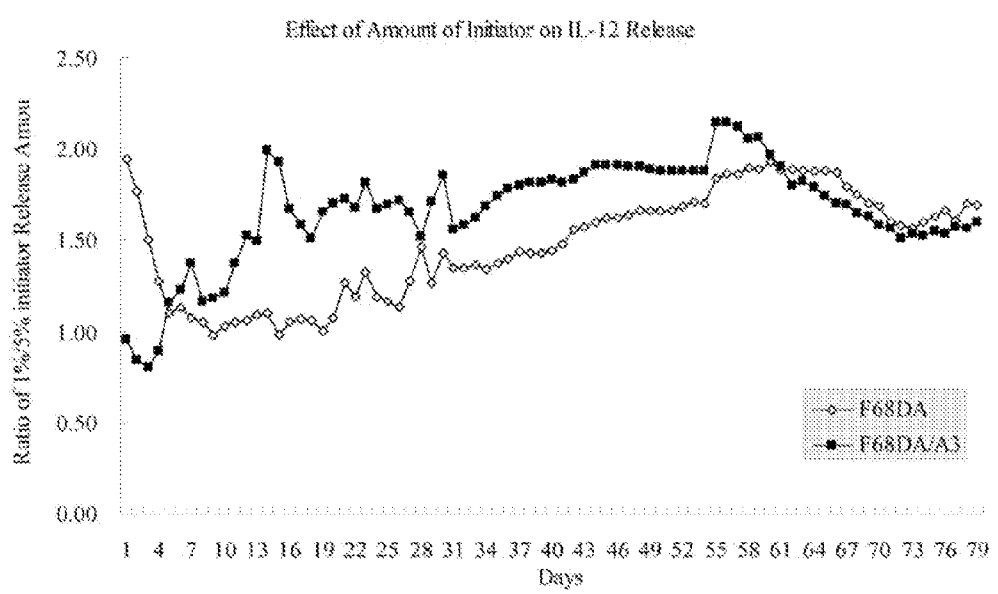

FIG. 17. Effect of amount of initiator by comparing release amount of samples with 1% and 5% initiator, respectively. See Section 6.2 for details.

Figure 18:
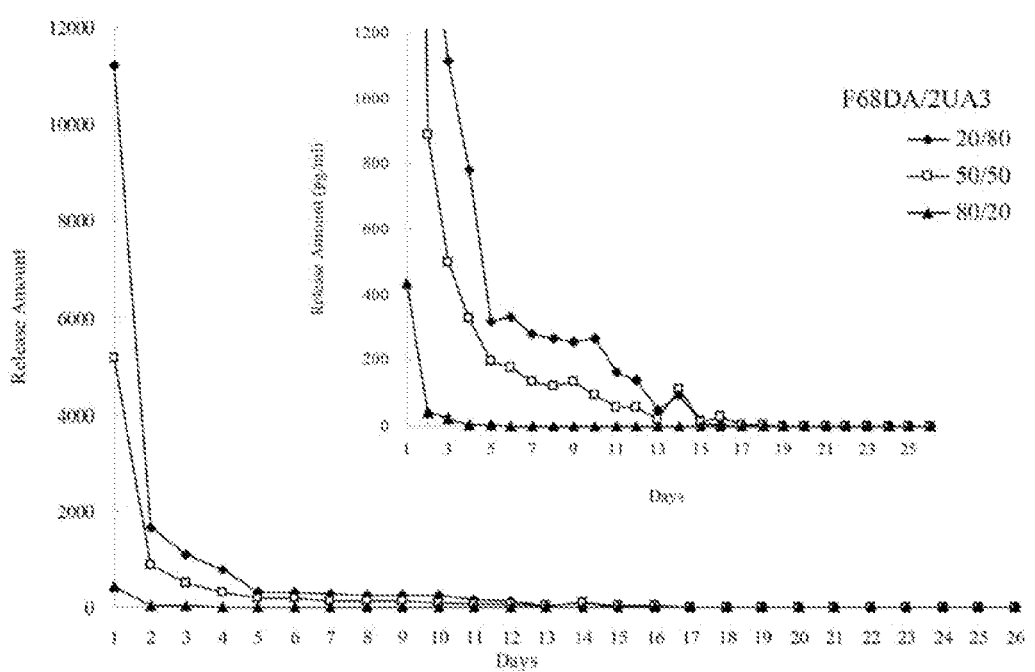

FIG. 18. Effect of amount of 2U-Arg-3 on IL-12 release pattern. See Section 6.2 for details.

Figure 19:
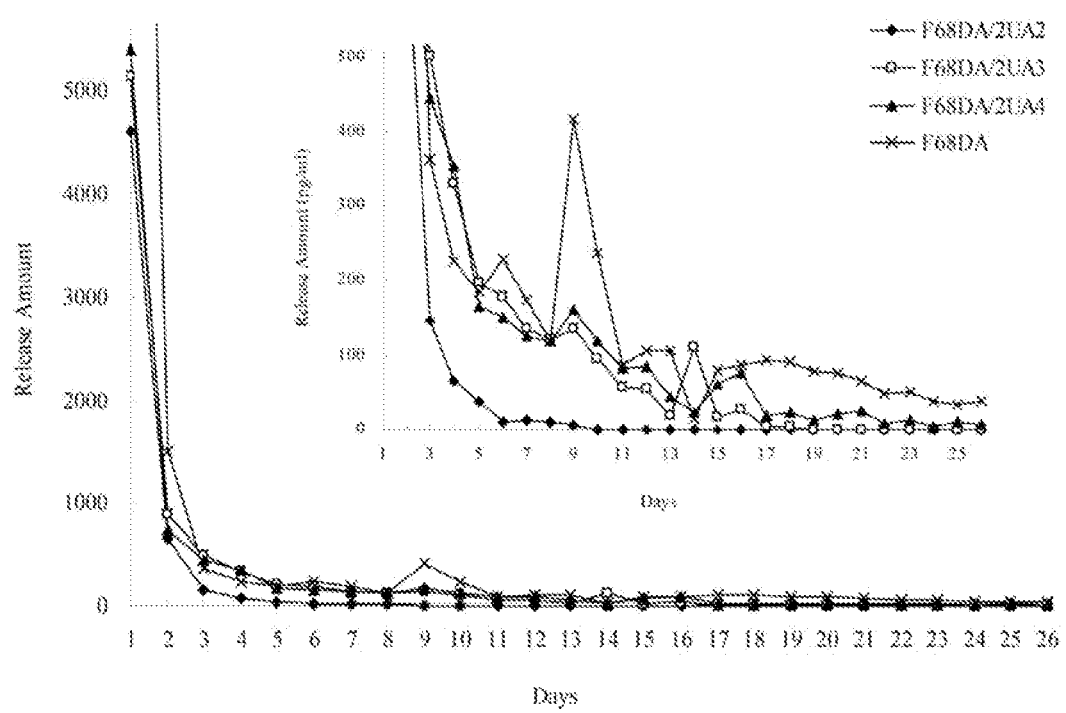

FIG. 19. Effect of different types of 2U-Arg-y(y-2, 3, 4) on IL-12 release pattern. All F68DA/2U-Arg-y is at ratio of 50/50, See Section 6.2 for details.

Figure 20:
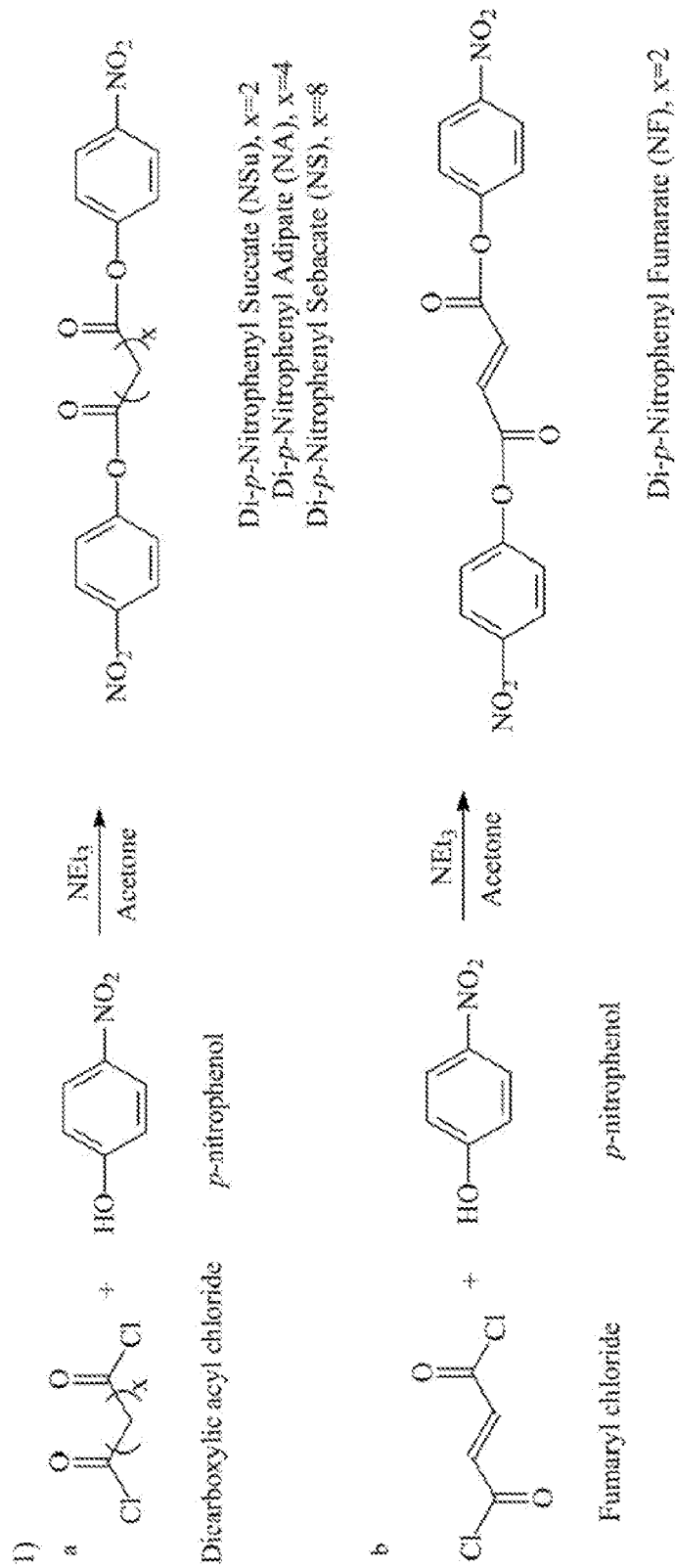

FIG. 20. Synthesis of monomers for arginine-based poly (ester-amide)s. 1) a. di-p-nitrophenyl esters of dicarboxylic acids, three saturated types: NSu, NA and NS; 1) b. one unsaturated type: NF. See Section 5.2 for details.

Figure 21:
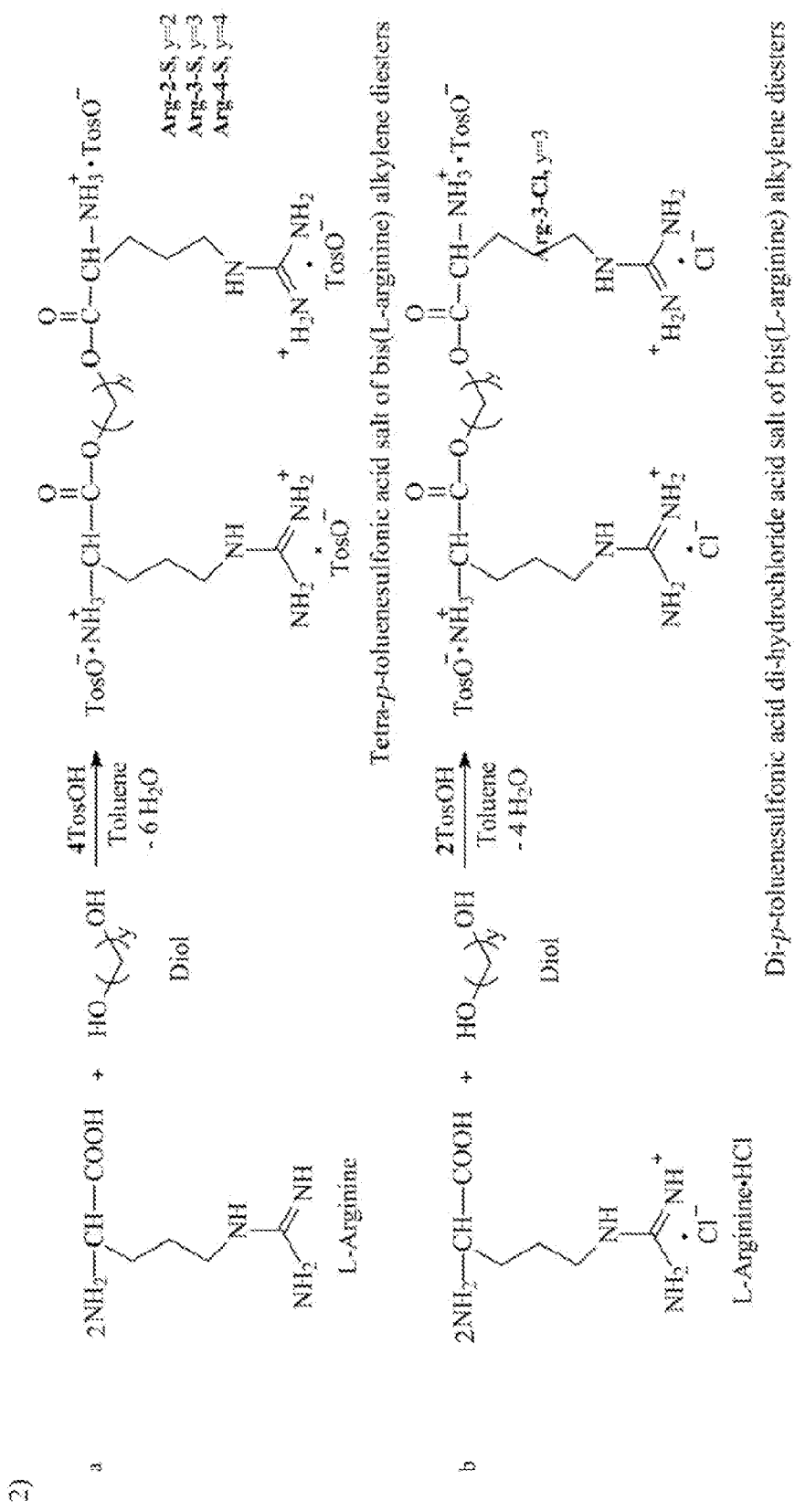

FIG. 21. Synthesis of monomers for arginine-based poly (ester-amide)s. 2) a. tetra-p-toluenesulfonic acid salt of bis (L-arginine) alkylene diesters, three types: Arg-2-S, Arg-3-S and Arg-4-S; 2) b. di-p-toluenesulfonic acid di-hydrochloride acid salt of bis(L-arginine)alkylene diesters, Arg-3-S—Cl See Section 5.2 for details.

FIG. 22. Synthesis of UArg-PEA polymers from unsaturated type monomer NF (see FIG. 20) and arginine toluenesulfonic acid or (hydrochloric acid) ester salt. The product is Formula I (FIG. 1). See Section 5.2 for details.

Figure 23:
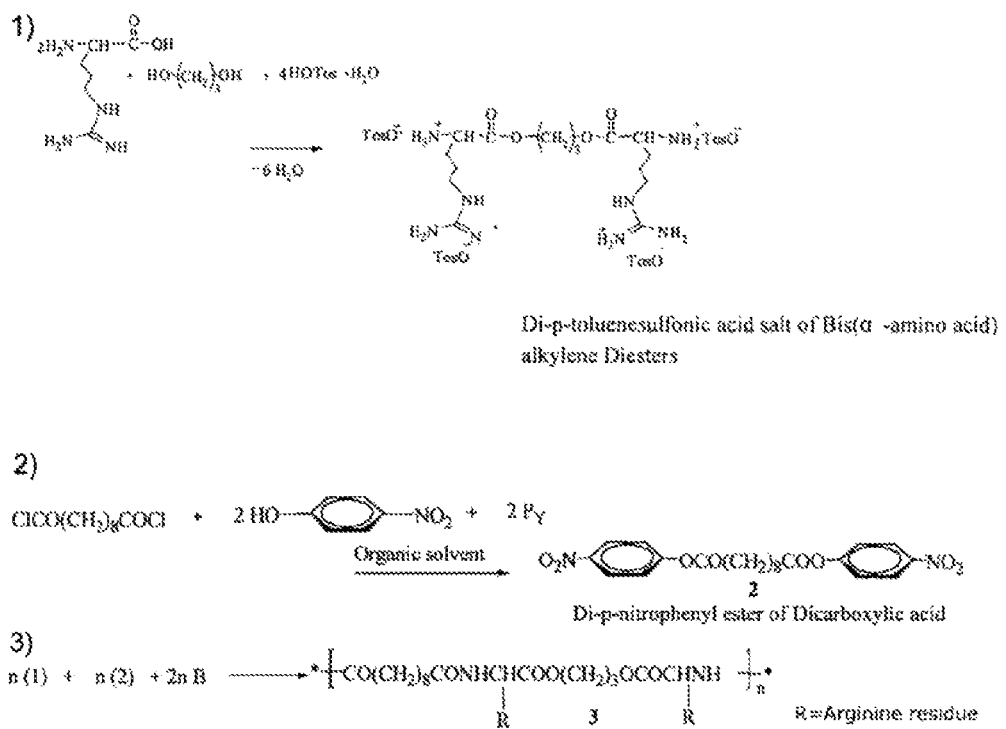

FIG. 23 is a chemical reaction scheme showing three steps in the synthesis of arginine-based poly(ester amides) (Arg-PEAs).

5. DETAILED DESCRIPTION OF THE INVENTION

The present invention is based on the discovery that cationic, thermoresponsive and biodegradable hydrogel compositions can be prepared from pluronic tri-block copolymers and arginine-based unsaturated poly(ester-amide) (UArg-PEA).

Cationic poly(ester amide) (PEA)-based hydrogels are provided. The hydrogels are fabricated from either unsaturated L-arginine based poly(ester-amide) (UArg-PEA) precursors, pluronicDA precursors, or a combination of both UArg-PEA and pluronicDA precursors at predetermined precursor composition ratios. Both the hybrid pluronicDA/UArg-PEA hybrid hydrogels and pure pluronicDA-based hydrogels are thermoresponsive and biodegradable, while pure UArg-PEA-based hydrogels are biodegradable but not thermoresponsive. UArg-PEA-pluronicDA-based and hybrid hydrogels can be synthesized from unsaturated arginine-based PEA salts and/or unsaturated pluronic acid polymers. Unsaturated pluronic acid polymers can be synthesized by reacting pluronic acid with acryloylchloride to provide functional vinyl groups at the two chain ends of pluronic acid.

UArg-PEA based, pluronicDA based and hybrid hydrogels can be used to carry and/or release molecules or compounds, and can function as biologic carriers for a variety of biomedical applications. The hydrogels can be used to carry and/or release bioactive molecules or compounds including but not limited to nutrients, pharmaceuticals, drugs, peptides, polypeptides, oligonucleotides and polynucleotides. They can be used, for example, to condense or capture and deliver peptides, polypeptides or polynucleic acids into target cells or tissues for various in vivo applications, such as in drug therapy, gene therapy or tissue engineering. In a specific embodiment, the hydrogels of the invention can be used to carry polynucleic acids such as DNA and cytokines such as interleukin-12 (IL-12). Methods for carrying biologic molecule(s) using the hydrogels are also provided.

Methods for synthesizing PEA-based hydrogels are provided. In one embodiment, the PEA-based hydrogels can be fabricated from two water soluble polymers: unsaturated arginine-based. PEA salt and pluronic tri-block copolymers (unsaturated pluronic acid). In another embodiment, unsaturated pluronic acid can be synthesized by reacting commercially available pluronic acid with acryloylchloride to provide functional vinyl groups at the two chain ends of pluronic acid.

For clarity of disclosure, and not by way of limitation, the detailed description of the invention is divided into the subsections set forth below.

5.1 UArg-PEA and PluronicDA Polymers

Arginine-based unsaturated poly(ester amide)s and pluronic triblock copolymers that can serve as precursors for fabricating hydrogels are provided. Cationic, thermoresponsive and biodegradable hydrogels based on these arginine-based unsaturated poly(ester amide)s and pluronic triblock copolymers are also provided.

Arginine-based unsaturated poly(ester-amide)s are polymers with ester, amide and L-arginine blocks on their backbones. They are water soluble, biodegradable and possess unique positive charge due to the L-arginine component.

In one embodiment, a composition comprising an unsaturated arginine-based poly(ester amide) based. (UArg-PEA) polymer having a chemical formula described by general structural formula (I) (FIG. 1) is provided;

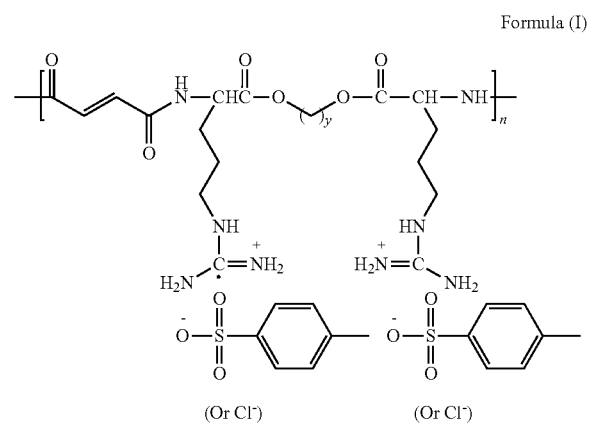

Formula (I)

wherein y indicates the number of methylene (—$CH_2$—) groups between two adjacent esters and wherein y=1-20. The subscript n indicates the number of repeat units and can range from about 5 to about 600.

In specific embodiments, UArg-PEA polymers are provided with the chemical structures shown in FIG. 1: UArg-PEA (2U-Arg-y-S), where y=2, 3, 4 correspond to, 2U-Arg-2-S, 2U-Arg-3-S, and 2U-Arg-4-S.

Tri-block copolymers of poly(ethylene oxide)-b-poly(propylene oxide)-b-poly(ethylene oxide) (also known as pluronic polymers or poloxamers) are widely used biocompatible polymers well known in the art.

Pluronic polymers belong to a class of polymeric surfactants that possess the ability to interact with biological membranes. They are a family of coblock polymers composed of polyethylene oxide (PEO) and polypropylene oxide (PPO), where PPO provides the central hydrophobic core where the methyl groups are believed to interact with the hydrophobic substance to be solubilized. Pluronic polymers have excellent water solubility, low toxicity and immunogenicity, and are approved by the FDA for use in vivo.

Pluronic polymers self-associate to form micelles in an aqueous solution in a dilute condition (Ishihara JWYKKWNK. Hydrogels, Encyclopedia of Biomaterials and Biomedical Engineering 2004:790-801; Wichterle O, Lim D. Hydrophilic Gels for Biological Use. Nature 1960; 185(4706):117-118). At high concentrations above ca.20% (w/v), they exhibit a thermoresponsive sol-gel transition behavior (Schild H G, Poly (N-Isopropylacrylamide)—Experiment, Theory and Application. Progress in Polymer Science 1992; 17(2):163-249). The thermoresponsive property of pluronic hydrogels can be attributed to LCST behavior that is mainly caused by a delicate balance of hydrophilic and hydrophobic moieties on the polymer structure (Kabanov A V, Nazarova I R, Astafieva I V, Batrakova E V, Alakhov V Y, Yaroslavov A A, Kabanov V A. Micelle Formation and Solubilization of Fluorescent-Probes in Poly(Oxyethylene-B-Oxypropylene-B-Oxyethylene) Solutions, Macromolecules 1995; 28(7):2303-2314).

In one embodiment of the invention, the two ends of pluronic polymers can be synthesized so that they form grafted double bonds to endow crosslinking ability. The PEO blocks confer water solubility to the polymer, although the hydrogen-bonding interactions of the ether oxygen with water molecules probably tend to occur all along the chain (Guo, K.; Chu, C. C; Chkhaidze, E.; Katsarava, R., Synthesis and characterization of novel biodegradable unsaturated poly(ester amide)s. Journal of Polymer Science Part a-Polymer Chemistry 2005, 43, (7), 1463-1477). Pluronic diacrylate (PluronicDA) has double bonds at both of its chain ends and can be used as a component of a desired hybrid hydrogel to endow UArg-PEAs with thermal responsiveness and enhance the drug release variety of the resulting hybrid hydrogel.

Pluronic polymers or poloxamers are classified by a three-digit numerical naming system where the first two digits multiplied by 100 give the approximate molecular weight of the hydrophobe, and the last digit multiplied by 10 gives the percent hydrophile (by molecular weight). In North America, they are also known as "pluronics," where the preceding letters F, P, or L denotes on whether the polymer is in flake, paste or liquid form. Poloxamers are not metabolized by the body and are renally excreted. They are considered to be inert materials and are listed in the Food and Drug Administration (FDA) inactive ingredients list. Pluronic polymers also demonstrate a lower critical solubility temperature (LCST) at physiological temperatures. The most commonly used poloxamers, F127 and F68, are known to undergo thermal gelation at physiological temperatures (Nystrom, B.; Walderhaug, H., Dynamic viscolasticity of an aqueous system of a polyethylene oxide)-poly(propylene oxide)-poly(ethylene oxide) triblock copolymer during gelation. Journal of Physical Chemistry 1996, 100, (13), 5433-5439; Malmsten, M.; Lindman, B., Self-Assembly in Aqueous Block Copolymer Solutions. Macromolecules 1992, 25, (20), 5440-5445).

In one embodiment, a composition comprising an unsaturated pluronic diacrylate (pluronicDA) polymer having a chemical, formula described by general structural formula (II) (FIG. 2) is provided:

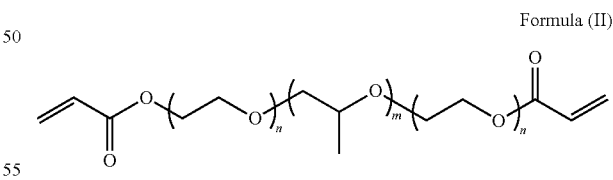

Formula (II)

wherein m is the number of polypropylene oxide segments and m=10-90 and a is the number of polyethylene oxide segments and n=1-150.

The UArg-PEA polymers and pluronicDA polymers provided by the invention can be water soluble. UArg-PEA has a >C=C< double bond imbedded in the backbone, so that it can undergo polymerization and crosslink with itself, another UArg-PEA, or pluronicDA by UV irradiation. In the last case, polymerization and crosslinking with pluronicDA, the resulting hydrogel will be a hybrid hydrogel. A crosslinking scheme is shown in FIG. 3.

5.2 Synthesis of Polymer Precursors for Hydrogels: L-Arginine Based Unsaturated Poly(Ester-Amide) (UArg-PEA) Polymers and Pluronic Diacrylate (PluronicDA) Polymers Synthesis and Characterization of Positively Charged Water Soluble Poly(Ester Amide)s L-Arginine (L-Arg), p-toluenesulfonic acid monohydrate, sebacoyl chloride, adipoyl chloride, ethylene glycol, 1,3-propanediol, 1,4-butanediol (Alfa Aesar, Ward Hill, Mass.) and p-nitrophenol (J. T. Baker, Phillipsburg, N.J.) can be used without further purification. Triethylamine (Fisher Scientific, Fairlawn, N.J.) can be dried by refluxing with calcium hydride, and then distilled. Solvents such as toluene, ethyl acetate, acetone, 2-propanol and dimethyl sulfoxide (DMSO) can be purchased from a commercial source (e.g., VWR Scientific, West Chester, Pa.) and purified by standard methods before use.

The general scheme used in synthesis of PEAs can be adapted for synthesis of Arg-PEAs (FIG. 23): the preparation of di-p-toluenesulfonic acid salts of bis(L-arginine)-$\alpha,\omega$-alkylene diesters (1), the preparation of di-p-nitrophenyl ester of dicarboxylic acids (2), and synthesis of PEAs (3) via solution polycondensation of (1) and (2). Methods for synthesizing these monomers are also described in U.S. Provisional Application No. 60/961,876 by Chu et ah, filed Jul. 24, 2007 and U.S. patent application Ser. No. 12/177,628 entitled "Biodegradable Cationic Polymer Gene Transfer Compositions and Methods of Use" by Chu et al, filed Jul. 22, 2008, which are incorporated herein by reference in their entireties.

(1) Synthesis of Di-p-Toluenesulfonic Acid Salt of Bis(L-Arginine)-$\alpha,\omega$-Alkylene Diesters L-arginine (0.02 mol) and 1,3-propanediol (0.01 mol) can be refluxed in toluene (80 mL) in the presence of p-toluenesulfonic acid monohydrate (0.04 mol). The solid-liquid reaction mixture can be heated to 120° C. and refluxed for 24 hr, generating 1.08 mL (0.06 mol) of water, which can be collected in a Dean-Stark, reflux condenser. The reaction mixture (never completely dissolved) can then be cooled to room temperature and toluene decanted.

The dried reacted mixture can be purified by re-precipitation twice from 2-propanol as follows. The mixture can be placed in a 500 mL round bottom flask filled with 2-propanol, and refluxed at 100° C. until ail the mixture is dissolved, then removed from heal, left in an oil bath overnight, and transferred to a freezer to form a white viscous mass as precipitate. The first re-precipitation yields purified crystals, which can be vacuum-dried prior to the second re-precipitation. The product salt is a white powder that can be obtained in nearly quantitative yield (~90%).

(2) Synthesis of Di-p-nitrophenyl Ester of Dicarboxylic Acids

Di-p-nitrophenyl adipate (m.p. 123-124° C.) can be prepared in nearly quantitative yield by the interaction of adipoyl chloride (1 mol) with p-nitrophenol (2.01 mol) in acetone in the presence of triethylamine (2.01 mol) at 0° to 5° C. The resulting di-p-nitrophenyl ester of adipic acid can be purified by repeated recrystallization from acetonitrile.

(3) Solution Condensation of (1) and (2)

Products of (1) and (2) can then be added to 1.2 M dry N'N-dimethylacetamide solution in a reaction vessel and kept overnight without stirring at 65° C. in a thermostat controlled oven. The resulting viscous reaction solution can be filtered through a glass filter and poured into distilled water. The resulting tar-like mass of precipitate can be thoroughly washed with distilled water for 3-7 days at room temperature to transform the tar-like substance into a non-sticky solid or rubbery polymer that still contains residual p-nitrophenol, a low molecular weight by-product of the solution polycondensation. To obtain the Arg-PEA free of p-nitrophenol, the polymer can be precipitated from a methanol solution (10% v/w) into 15-20 fold excess (by volume) of ethyl acetate. The precipitated polymer can be separated by decanting the liquid phase, washed three to four times with fresh ethyl acetate (40-50% of the starting volume of ethyl acetate), and finally dried under a reduced pressure at 50-60 mm mercury to a constant weight. After drying, the polymer will become corneous and can be removed from the vessel by dissolving in chloroform and solvent casting onto glass plates. Obtained polymers can be characterized by NMR spectroscopy and average molecular weights determined by gel permeation chromatography (GPC).

Synthesis of Unsaturated L-Arginine Based Poly(Ester-Amide) (UArg-PEA) Polymers

FIGS. 20 and 21 show the synthesis of monomers for arginine-based poly(ester amide)s.

FIG. 20(1a) shows the synthesis of three saturated types of di-p-nitrophenyl esters of dicarboxylic acids, di-p-Nitrophenyl Succate (NSu), x=2; di-p-NitrophenylAdipate (NA), x=4; di-p-Nitrophenyl Sebacate (NS), x=8, and one unsaturated type, di-p-Nitrophenyl Fumarate (NF), x=2. For example, di-p-nitrophenyl Succinate (NSu) can be prepared by the interaction of the succinyl chloride (0.03 mol, 3.2 mL) with p-nitrophenol (0.0603 mol) in acetone in the presence of triethylamine (0.063 mol), with the p-nitrophenol and triethylamine mixed acetone solution (100 mL) maintained at 0° C. Succinyl chloride can be diluted in 50 mL of acetone before being dropped into the chilled solution with stirring for 2 h at 0° C. and overnight at room temperature. The resulting di-p-nitrophenyl ester of succinic acid can be precipitated in distilled water, dried in vacuo at room temperature before final recrystallization from ethyl acetate three times.

FIG. 21 shows the synthesis of monomers for arginine-based poly(ester amide)s. FIG. 21(2a) shows three types of tetra-p-toluenesulfonic acid salt of bis(L-arginine)alkylene diesters: Arg-2-S, Arg-3-S and Arg-4-S. FIG. 21(2b) shows di-p-toluenesulfonic acid di-hydrochloride acid salt of bis(L-arginine)alkylene diesters, Arg-3-S—Cl. Monomers such as the following can be made, where y is the number of methylene groups and can range from 2 to 4. Tetra-p-toluenesulfonic acid salt of bis(L-arginine) ethane diesters Arg-2-S, y=2; tetra-p-toluenesulfonic acid salt of bis(L-arginine) propane diesters, Arg-3-S, y=3; tetra-p-toluenesulfonic acid salt of bis(L-arginine) butane diesters, Arg-3, y=4; di-p-toluenesulfonic acid di-hydrochloride acid salt of bis(L-arginine) propane diesters, Arg-3-S—Cl, y=3.

For example, toluenesulfonic acid salt of arginine diester can be synthesized by directly condensing Arg-3-S, L-arginine (0.02 mol) and 1,3-propanediol (0.01 mol) w in refluxed toluene (d.p. 110° C.) (80 ml) with the presence of p-toluenesulfonic acid monohydrate (0.04 mol) (FIG. 21). The heterogeneous solid-liquid reaction mixture can be heated (e.g., to 120° C.), refluxed (e.g., for 24 hr) and collected (e.g., by a Dean-Stark apparatus). The reaction, mixture can then be cooled to room temperature and solvent (e.g., toluene) decanted. The resulting dried mixture can then be purified by repeated precipitation (e.g., in 2-propanol three times).

The reaction mixture can be completed dissolved in 2-propanol with refluxing (e.g., at 100° C.). The clear solution obtained can then be cooled to room temperature and/or frozen to promote further precipitation. 2-propanol can be decanted afterwards, and the residual white sticky mass dried in vacuo. The final product will be a powder.

The starting arginine monomer used for the synthesis of di-p-toluenesulfonic acid di-hydrochloride acid salt of arginine diester can be L-arginine hydrochloride instead of L-arginine. Since the counterfeit Cl⁻ is already attached to the arginine monomer, a 1:1 ratio of p-toluenesulfonic acid to arginine HCl can be used. All the other steps of the synthesis can be carried out as described above.

Table 1 shows that saturated arginine-based PEAs (SArg-PEAs) and unsaturated arginine-based PEAs (UArg-PEAs) can be prepared by solution polycondensation of monomers (e.g., Arg-2-S, Arg-3-S, Arg-4-S, Arg-3-S—Cl and NSu, NA, NS and NF) by using different synthetic combinations. SArg-PEAs cannot crosslink to form hydrogels, whereas UArg-PEAs can polymerize and crosslink to form hydrogels as described herein.

TABLE 1

Polymers that can be synthesized by different combinations of monomers

| Monomers | Polymers |
|---|---|
| NSu + Arg-2-S | 2-Arg-2-S |
| NSu + Arg-3-S | 2-Arg-3-S |
| NA + Arg-3-S | 4-Arg-3-S |
| NA + Arg-4-S | 4-Arg-4-S |
| NS + Arg-3-S | 8-Arg-3-S |
| NS + Arg-4-S | 8-Arg-4-S |
| NF + Arg-2-S | 2U-Arg-2-S |
| NF + Arg-3-S | 2U-Arg-3-S |
| NF + Arg-4-S | 2U-Arg-4-S |
| NF + Arg-3-Cl | 2U-Arg-3-S-Cl |

A method for synthesizing UArg-PEA polymers is provided (FIG. 22). FIG. 22 shows the synthesis of UArg-PEA polymers from an unsaturated type monomer di-p-nitrophenyl fumarate NF (NF is shown in FIG. 20) and an arginine toluenesulfonic acid (or hydrochloric acid) ester salt. The NF and the arginine toluenesulfonic acid (or hydrochloric acid) ester salt are reacted with triethylamine ($Et_3N$) (or 4-dimethylamino-pyridine (DMAP), sodium carbonate or sodium bicarbonate) and with dimethylsulfoxide (DMSO) (or dimethylformamide (DMF) or dimethylacetamide (DMA)) organic solvent. The $Et_3N$, DMAP, sodium carbonate or sodium bicarbonate acts as an acid acceptor during the polycondensation step of synthesizing UArg-PEA.

Three exemplary UArg-PEAs that can be synthesized and used as polymer precursors for fabricating hydrogels are summarized in Table 2. Based on the synthesis and characterization methods disclosed herein, other UArg-PEAs that can be used as polymer precursors for hydrogels can be determined by the skilled practitioner.

TABLE 2

Exemplary UArg-PEAs that can synthesized as polymer precursors for hydrogel fabrication

| Monomer Combinations | Monomer Containing >C=C< | UArg-PEA Obtained |
|---|---|---|
| NF + Arg-2 | NF | 2U-Arg-2-S |
| NF + Arg-3 | NF | 2U-Arg-3-S |
| NF + Arg-4 | NF | 2U-Arg-4-S |

Synthesis of PluronicDA Polymers

PluronicDA polymers can be synthesized as shown in FIG. 2. The method comprises (a) reacting a pluronic acid solution with an acid acceptor (e.g., triethylamine or DMAP) at a concentration in molar excess of each —OH group on the pluronic acid; and (b) reacting the pluronic acid solution with acryloyl chloride at a concentration in molar excess of each —OH group on the pluronic acid, thereby forming acrylate diesters of pluronic acid (pluronicDA). The pluronicDA product can then be recovered by precipitation.

For example, pluronic acid (e.g., F127 or F68) can be dissolved in benzene and heated with stirring until a complete dissolution. After the solution is cooled to room temperature, triethylamine, at a concentration in molar excess of each —OH group on the pluronic acid, can be added to the pluronic acid solution. Then acryloyl chloride, also at a concentration in molar excess of each —OH group on the pluronic acid, can be added to the pluronic acid solution to form acrylate diesters of pluronic acid. The mixture can be stirred (e.g., at room temperature for overnight) under a nitrogen atmosphere. The insoluble triethylamine salts formed during the reaction can be removed by filtration and the pluronicDA product can be precipitated in chilled hexane and collected by filtration. Further purification can be performed by repeatedly redissolving in benzene and reprecipitating in chilled hexane. The pluronicDA polymer can be dried in vacuo oven at room temperature and stored at 4° C. for future use.

An exemplary synthesis of pluronic F127 Diacrylate (F127DA) and F68 Diacrylate (F68DA) is as follows. 25 g of F127 (2.08 mmol) is dissolved in benzene under nitrogen atmosphere and dried by refluxing the solvent through a Soxhlet extractor filled with activated molecular sieves. After 4 h, the solution was slowly cooled to room temperature and then to 0° C. with an ice bath. In a dropping funnel were introduced first 1.2 mL of triethylamine (8.63 mmol, 2 equiv. per OH group), then 20 mL of dichloromethane, and finally 0.5 of freshly distilled acryloyl chloride (6.24 mmol, 1.5 equiv. per OH group) diluted in 20 mL of dichloromethane. The mixture was stirred for 12 h, then the precipitated triethylammonium chloride was filtered away and the solvent evaporated at the rotary evaporator. The resulting viscous oil was dissolved in dichloromethane, washed with water, dried over sodium sulfate and finally precipitated in cold diethyl ether. Conversion 100% (from 1H NMR data). Yield 80%, FT-IR: 2 990-2 790 (n C_H), 1 724 (n C—O), 1 467 (ds CH2), 1 342, 1 279, 1 242, 1 097 (nas C_O_C), 962, 841 (ns C_O_C) cm_1H NMR (CDCl3): d ¼ 1.1 (m, 190H PPO methyl group 63 monomeric units), 3.4 (m, 63H, PPG methyl group 63 monomeric units), 3.5 (m, 124H, PPG methylene group 62 monomeric units), 3.65 (m, 818H, PEG chain protons ¼ 204 monomeric units), 4.3 (t, 2H, _CH2_CH2_O_CO_CH— CH2), 5.8 (dd, 2H, CH2-CH_COO_), 6.15 and 6.4 (both dd, Scheme 1, FIG. 20. 2H, CH2-CH_COO_).

5.3 L-Arginine Based Unsaturated Poly(Ester Amide) (UArg-PEA) Based Hydrogels, Pluronic Diacrylate (PluronicDA) Based Hydrogels, Hybrid PluronicDA/UArg-PEA Based Hydrogels and Synthesis of Hydrogels UArg-PEA based, pluronic diacrylate (PluronicDA) based, and hybrid hydrogels are provided. These hydrogels can be cationic, thermoresponsive and biodegradable. Methods for synthesizing these hydrogels are also provided.

A hybrid hydrogel refers to a hydrogel system that contains two or more components of distinct classes of molecules, in a specific embodiment, a composition is provided for fabricating a hybrid hydrogel comprising UArg-PEA and pluronicDA polymers. In another embodiment, a hybrid hydrogel is provided comprising polymerized and crosslinked UArg-PEA and pluronicDA polymers. After polymerization and crosslinking, the UArg-PEA and unsaturated pluronicDA polymers become partly or fully saturated. Thus, when UArg-PEA and pluronicDA polymer precursors react to form hydrogels, they lose their unsaturated character, i.e., UArg-PEA precursor becomes SArg-PEA in the hydrogel, and pluronicDA precursor becomes pluronic acid in the hydrogel.

UArg-PEA and pluronic diacrylate (PluronicDA) polymers can be synthesized and crosslinked in a micellar gel state to form a hydrogel. In one embodiment, the crosslinking can be achieved by photopolymerization or UV crosslinking. In another embodiment, crosslinking can be achieved through use of a chemical cross Sinker, e.g., any compound with a bi-thio (—SH) group that can react with a double bond of an unsaturated pluronicDA or UArg-PEA polymer.

PluronicDA based hydrogels can be prepared by photopolymerization of pluronicDA polymers with small amount of a water soluble initiator. UArg-PEA based hydrogels can be prepared by photopolymerization of UArg-PEA polymers with small amount of a water soluble initiator, PluronicDA/UArg-PEA based hybrid hydrogels can be prepared by photopolymerization of different weight ratios of the two polymers, pluronicDA and UArg-PEA, with a small amount of a water soluble initiator. Such initiators are well known in the art, and can be used in the range of approximately 1% to 5%.

As well known in the art, higher amount of initiator in the hydrogel formulation can lead to higher crosslinking density or denser gel structure. Hybrid pluronicDA/UArg-PEA based hydrogels can possess a combination of favorable hydrogel properties: thermal responsiveness and positive charges.

The preparation of pure pluronicDA based or UArg-PEA based hydrogels is basically the same as that of a hybrid pluronicDA/UArg-PEA based hydrogel. Differences can be observed in the time to reach foil crosslinking. Pure pluronicDA based hydrogels need seconds to minutes to be fully crosslinked depending on the concentrations of pluronicDA and initiator in the solution mixture. Pure UArg-PEA based hydrogels, on the other hand, need much longer UV irradiation time, generally in the range of hours. One example of a pure UArg-PEA based, hydrogel is: 20 wt % UArg-PEA dissolved in distilled water, loaded with 5% initiator, left under UV light for 15 hrs. The resulting hydrogel has small, swelling ratio when, compared with a pluronicDA based or a hybrid pluronic DA/UArg-PEA based hydrogel.

Hydrogels can be pre-loaded with a molecule or compound of interest. For example, to make a 50/50 F68DA/2U-Arg-3-S hybrid hydrogel loaded with the drug paclitaxel, 0.3 g F68DA, 0.3 g 2U-Arg-3-S, and 0.06 g initiator can be mixed together, and dissolved in 3 ml of mixed solvent solution. To make the mixed solvent solution, paclitaxel can be pre-dissolved in ethanol at a concentration of 12 mg/ml. The 3 ml of mixed solvent solution therefore comprises 1 ml paclitaxel ethanol solution, 0.4 ml DMSO and 1.6 ml ethanol. The solution of F68DA and 2U-Arg-3-S polymers with initiator and mixed solvents can be heated slightly and photopolymerized under UV light.

The synthesized hydrogels can exhibit semi-reversible thermoresponsive swelling behavior in an aqueous solution over a wide range of temperatures or in response to thermal cycling. The inner core structure of pluronic micelles entrapped within a photo-crosslinked polymer network can sensitively respond to temperature. The ester linkage located at the junctions of pluronic micelles to crosslinked polymer network is slowly cleaved by hydrolysis, making these hydrogels biodegradable.

In a specific embodiment a hybrid pluronicDA/UArg-PEA based hydrogel can be synthesized as follows. Reagents such as L-Arginine (Sigma, cat#A3784), L-arginine hydrochloride (Sigma), p-toluenesulfonic acid monohydrate (Alfa Aesar Stock#36506, Ward, Hill, Mass.), succinyl chloride, sebacoyl chloride, adipoyl chloride, ethylene glycol, 1,3-propanediol (Avocado Research Chemicals Ltd. Stock#A10829), 1,4-butanediol (Alfa Aesar, Ward Hill, Mass.) and p-nitrophenol (J. T. Baker, Phillipsburg, N.J.) can be used without further purification.

p-toluenesulfonic acid monohydrate, furanyl chloride, ethylene glycol, 1,3-propanediol, 1,4-butanediol (Alfa Aesar, Ward Hill, Mass.) and p-nitrophenol (J. T. Baker, Phillipsburg, N.J.) can also used without farther purification. Pluronic F127 (Mw=12600), F68 (Mw=8700) and acryloyl chloride (Aldrich Chemical Company, Milwaukee, Wis.) can be used without further purification.

Triethylamine from Fisher Scientific (Fairlawn, N.J.) can be dried by refluxing with calcium hydride, and then distilled. Solvents such as toluene, ethyl acetate, acetone, 2-propanol and dimethyl sulfoxide (DMSO) can be purified by standard methods before use. Initiator Irgacure 2959 can be used, which contains 2-hydroxy-1-[4-(hydroxyethoxy]phenyl]-2-methyl-1-propanone (Ciba Specialty Chemicals Inc.)

In another embodiment, to synthesize a hybrid pluronicDA/UArg-PEA based hydrogel, 0.08 g of 2U-Arg-2-S polymer and 0.32 g of P68DA polymer (20/80 weight ratio of 2U-Arg-2-S/F68DA) are added into a vial (Φ=25 mm) and dissolved in 2 mL of distilled water to form a clear homogeneous solution. 0.02 g of photoinitiator Irgacure 2959, (5 wt % of total amount of polymers) is added into the polymer solution and dissolved completely by heating slightly. The solution is irradiated by a long-wavelength UV lamp (365 nm, 16 W) for an hour at room temperature.

The resultant hydrogel (Φ=25 mm an thickness≈4 mm) is removed and Immersed in distilled water at room temperature for 48 hr to remove any residual chemical. The distilled water is replaced periodically. After this purification process, the hydrogel is soaked in distilled water to reach swelling equilibrium, and then removed and dried in vacuo at room temperature for 48 hr before further characterization.

The gel fraction ($G_f$) of the hydrogel can be defined by the following equation:

$$G_f = \frac{W_d}{W_p} \times 100\%$$

where $W_d$ is the weight of dry hydrogel and Wp is the total feed, weight of the two polymers and the photoinitiator.

Properties of Hydrogels

Tables 3 and 4 (Example 6.2) show the properties of an exemplary series of pluronicDA/UArg-PEA based hybrid hydrogels of the invention. The gel fraction ($G_f$) of the hybrid hydrogels is lower than that of pure F68DA based hydrogel when the UArg-PEA polymer precursor is 20% of the total weight, but is about the same when their weight percentage is dropped to 10% as in Table 4.

With reference to Tables 3 and 4 (Example 6.2), the swelling ratio at equilibrium ($Q_{eq}$) increases with the increase of methylene chain length in UArg-PEA (from 2U-Arg-2-S to 2U-Arg-4-S). This is because 2U-Arg-4-S has the lowest crosslinking density, and therefore bigger holes or larger spaces for storing water inside of the hydrogel. The compressive modulus is the lowest, for 2U-Arg-4-S for the same reason.

The pluronicDA based hydrogels and pluronicDA/UArg-PEA based hybrid hydrogels can have thermal responsiveness. Tri-block copolymers pluronics self-associate to form micelles in an aqueous solution in a dilute condition. At high concentrations above approximately 20% (w/v), tri-block copolymers pluronics exhibit thermoresponsive sol-gel transition behavior (Jun Bae Lee, Jun Jin Yooni, Doo Sung Lee, Tae Gwan Park, Photo-crosslinkable, thermo-sensitive and biodegradable pluronic hydrogels for sustained release of protein, J. Biomater. Sci. Polymer Edn, 2004; 15(1.2): 1.571-1583). The thermoresponsive property of the pluronic hydrogels can be attributed to a lower critical solution temperature (LCST) behavior that is mainly caused by a delicate balance of hydrophilic and hydrophobic moieties on the polymer structure. The LCST is closely related to critical micelle temperature (CMT) in pluronic copolymers. Highly concentrated pluronic copolymer solution instantaneously turns into a thermo-setting gel state upon increasing the temperature above the LCST by the formation of closely packed spherical micelles (Jun Bae Lee, Jun Jin Yooni, Doo Sung Lee, Tae Gwan Park. Photo-crosslinkable, thermo-sensitive and biodegradable pluronic hydrogels for sustained release of protein, J. Biomater. Sci. Polymer Edn, 2004; 15(12):1571-1583).

The semi-solidified gel structure formed above the CMT, however, can lose its structural integrity upon dilution with other aqueous fluids, due to an immediate decrease in the copolymer concentration, required for the close packing of pluronic micelles. In one embodiment, a UV induced crosslinking network is produced in the pluronic hydrogel to prevent this from happening, while the thermal responsiveness is maintained.

As can be seen in FIG. 7, the swelling ratio of the pluronicDA based hydrogels and pluronicDA/UArg-PEA based hybrid hydrogels can monotonically decrease with increasing temperature because the entrapped thermally responsive pluronic micelles play a role in controlling the swelling ratio.

5.4 Characterization of Hydrogels

Hydrogels can be characterized by methods well known in the art, such as gel fraction ($G_f$), equilibrium swelling ratio ($Q_{eq}$), compressive modulus and interior morphology. The effects of the feed ratio of the polymer precursors (e.g., pluronicDA:UArg-PEA) on the properties of the hydrogel can also be determined.

FTIR Spectroscopy

Fourier transform infrared (FTIR) testing using standard methods known in the art can be used to characterize polymers. For example, polymers can be ground into powder, mixed with KBr at a 1:10 weight ratio, and then compressed into KBr pellets, FTIR spectra can be obtained from a spectrometer (e.g., a Perkin-Elmer Nicolet Magan 560 FTIR spectrometer, Madison, Wis.) using standard methods. Standard software packages such as the Omnic software package (Thermo Fisher Scientific Inc., Waltham, Mass.) can be used for data acquisition and analysis.

Swelling Kinetics Measurement

Swelling kinetics of hydrogels can be measured using standard methods. Dry hydrogels can be weighed and immersed in 15 mL of PBS buffer solution at room temperature for predetermined periods, then removed and weighed after removal of surface water. The swelling ratio can be calculated, according to the equation below:

$$Q = \frac{W_s - W_d}{W_d} \times 100\%$$

where $W_s$ is the weight of swollen hydrogel at time t and $W_d$ is the weight of dry hydrogel at t=0.

Mechanical Testing

Compressive mechanical testing of swollen hydrogels can be conducted using standard, methods. The compressive moduli can be calculated from the slope of the initial linear portion of the curve. Each type of hydrogel can be repeat-tested and the mean value calculated with a standard, deviation using standard methods known in the art.

SEM of Interior Morphology

Standard methods of scanning electron microscope (SEM) can be employed to analyze the interior morphological structure of hydrogels as a function of the feed ratio of the hydrogel polymer precursors. Standard cryofixation techniques can be used to observe the swollen hydrogel structure. For example, an individual hydrogel can be incubated in distilled wafer at room temperature to reach its swelling equilibrium. The hydrogel can then be gently removed and immediately transferred into liquid nitrogen to freeze and retain the swollen structure. The sample can then be prepared for SEM observation by freeze-drying under vacuum, fixation on aluminum stubs and coating with gold.

5.5 Delivery and/or Release of Molecules of Interest by Hydrogels

Methods for using UArg-PEA based hydrogels, pluronicDA based hydrogels and hybrid hydrogels to carry and/or release molecules or compounds are provided.

In one embodiment, a method for controlling release of a molecule or compound is provided. The method comprises providing a UArg-PEA based, pluronicDA based and/or hybrid hydrogel wherein the molecule or compound is loaded in the hydrogel.

In another embodiment, a method for directing release of a molecule or compound in an area of interest is provided. The method comprises providing a UArg-PEA based, pluronicDA based and/or hybrid hydrogel, wherein the molecule or compound is loaded in the hydrogel and wherein the hydrogel is inserted in the area of interest in a subject. The area of interest can be, for example, an area of the subject's body, a body part, an organ, an organ system, a cell or a tissue.

In another embodiment, an apparatus for controlling release of a molecule or compound comprising a hydrogel of the invention is provided.

In another embodiment, an apparatus for directing release of a molecule or compound in an area of interest comprising a hydrogel of the invention is provided.

Such apparatuses can be inserted, or injected into, or affixed or attached to, the area of interest.

In another embodiment, a kit comprising a hydrogel of the invention or an apparatus of the invention is provided.

The UArg-PEA based hydrogels, pluronicDA based hydrogels and hybrid hydrogels can be used as biologic carriers for a variety of biomedical applications. The hydrogels provided by the invention can be used to carry and/or release bioactive molecules or compounds. Using the hydrogels of the invention, bioactive compounds can be carried and/or released, in the area of interest. Bioactive compounds can be agents used for delivery to cells, tissues or organs for nutrient; physiological or therapeutic effect. Bioactive molecules are well known in the art and can include but are not limited to nutrients, pharmaceuticals, drugs, peptides, polypeptides, oligonucleotides and polynucleotides.

Bioactive molecules can be loaded into the hydrogels of the invention and used for rapid controlled release and/or slower sustained release. Release rates can be controlled by varying the hybrid ratio during photo-polymerization. Various release profiles can also be attained by varying methylene chain length of UArg-PEA.

A hydrogel of the invention can be selected for hydrophilicity or hydrophobicity, positive charge and/or less crosslinking density or the type of crosslinker in the hydrogel to promote release of a molecule of interest. Biologically active compounds can be pre- or post-loaded into the hydrogels using methods known, in the art. For pre-loading, biologically active agents can mixed with the gel precursors and gelation subsequently conducted. Owing to the cationic nature of UArg-PEA hydrogels, any anionic biological agents known in the art, e.g., heparin, DNA, growth factors, cytokines, can be post-loaded into hydrogels of the invention after the gels are fabricated. Examples of anionic growth factors include, but are not limited to, acidic fibroblast growth factor (aFGF), hypothalamus-derived growth factor (aHDGF) The electrostatic interaction will attract the anionic biological agents into the cationic hydrogels of the invention. In a specific embodiment, cancer therapy drugs such as interleukin-12 (IL-12) or paclitaxel can be preloaded into a hydrogel of the invention and delivered for cancer therapy.

The release of a molecule of interest from a loaded hydrogel can be studied using standard methods known in the art. For example, release studies can be carried out in PBS buffer with or without trypsin (0.1 mg/mL). Hydrogel samples (e.g., small pellet) loaded with the molecule of interest can be inserted into a small vial containing 5 mL PBS (or PBS-trypsin) solution. The whole system can be incubated at 37° C. with constant reciprocal shaking (ca. 100 rmp). Every 24 h, hydrogel samples can be transferred to a new vial with 5 mL fresh PBS (or PBS-trypsin) solution.

To determine the release amount of a molecule of interest such as a drug, an art known solvent such as 5 mL of acetonitrile can be added into the 5 ml, collected release medium. The solution can be vortexed to dissolve all the molecule of interest in the solution. Content of the molecule of interest can then be analyzed by high performance liquid chromatography (HPLC) using standard methods. Standard software packages such as ChemStation (Palo, Alto, Calif., USA) can be used for data analysis.

Standard methods, e.g., sandwich ELISA methods, can also be used to quantify release of molecules of interest, from hydrogels.

6. EXAMPLES

6.1 Example 1

Synthesis and Characterization of L-Arginine Based Unsaturated Poly(Ester-Amide)/Pluronic Diacrylate Based Hydrogels

6.1.1 Summary of the Example

This example describes the synthesis and characterization of L-arginine based unsaturated poly(ester-amide)/pluronic DA based hydrogels.

Thermoresponsive and biodegradable hydrogels based on pluronic tri-block copolymers and arginine-based unsaturated poly(ester-amide) (UArg-PEA) were prepared by photo-polymerization. Two terminal hydroxyl groups in pluronic F127 or F68 (FIG. 2) were acrylated to form a pluronic polymer. Hydrogels were characterized by gel fraction ($G_f$), equilibrium swelling ratio ($Q_{eq}$), compressive modulus and interior morphology. The effect of the feed ratio of the hydrogel polymer precursors (pluronicDA:UArg-PEA) on the properties of the hydrogel was also studied. The incorporation of UArg-PEA polymers into pluronicDA based hydrogels increased their hydrophilicity, decreased crosslinking density, mechanical strength, and $Q_{eq}$. The differences in hydrogel properties with different hybrid ratio were correlated to the chemical structural of the UArg-PEA segments, i.e., length of methylene groups in UArg-PEA or the hydrophobicity of UArg-PEA The photo-crosslinked pluronicDA/UArg-PEA based hydrogels prepared by UV radiation showed a gradually decreased swelling ratio with increasing temperature and exhibited a thermally-responsive change in the swelling ratio when the temperature was cycled between 4° C. and 37° C. These hydrogels degraded slowly due to the cleavage of ester linkage in the acrylated pluronic terminal UArg-PEA.

When paclitaxel, a model anti-cancer drug, was loaded in the hydrogels, bi-phasic protein release profiles were attained; a burst-free and rapid controlled release profile was initially observed for a one week period and a much slower sustained release was followed thereafter. The release rates could be controlled by varying the hybrid ratio during photo-polymerization.

When plasmid DMA was loaded in the hydrogels for sustained delivery, various release profiles were attained by varying methylene chain length in UArg-PEA. The overall release rate was very slow and the released amount was too low to induce any transfection of cells.

6.1.2 Introduction

Hybrid hydrogels refer to hydrogel systems that contain two or more components of distinct classes of molecules. Hybrid hydrogels were created with a combination of favorable properties: thermal responsiveness and positive charges. A series of biodegradable hydrogels was designed and synthesized from three types of UArg-PEA and two types of pluronicDA (F127DA, F68DA) by UV photocrosslinking. Pluronic is one of the most widely used biocompatible polymers with excellent water solubility, low toxicity and immunogenicity, and more importantly, it is approved by the FDA for use in vivo. PluronicDA has double bonds at both of its chain ends, was chosen as the component to endow UArg-PEAs with thermal responsiveness and enhance the drug release variety of the resulting hybrid hydrogel.

The newly synthesized biodegradable pluronicDA/UArg-PEA based hydrogels were characterized by gel fraction ($G_f$), equilibrium swelling ratio ($Q_{eq}$), compressive modulus and interior morphology. The effects of the feed ratio of the hydrogel polymer precursors (pluronicDA:UArg-PEA) on the properties of the hydrogel were studied.

Paclitaxel (M2-853.92 Da) is a natural substance derived from the yew tree. The drug is administered intravenously and used as an important chemotherapy drug to treat people with a variety of cancers. However, paclitaxel is highly lipophilic and virtually insoluble in water. Many attempts have been made to delivery paclitaxel. The study described in this example was designed to observe the release of hydrophobic paclitaxel from a hydrophilic system.

Plasmid DNA was also loaded into hybrid hydrogels to study its release pattern, in view of potential electrostatic interactions between the positive charge on the arginine of the hydrogel and the negative change on DNA.

6.1.3 Materials

L-Arginine (Sigma, cat#A3784), L-arginine hydrochloride (Sigma), p-toluenesulfonic acid monohydrate (Alfa Aesar Stock#36506, Ward, Hill, Mass.), succinyl chloride, sebacoyl chloride, adipoyl chloride, ethylene glycol, 1,3-propanediol (Avocado Research Chemicals Ltd. Stock#A10829), 1,4-butanediol (Alfa Aesar, Ward Hill, Mass.) and p-nitrophenol (J. T. Baker, Phillipsburg, N.J.) were used without further purification.

p-toluenesulfonic acid monohydrate, furanyl chloride, ethylene glycol, 1,3-propanediol, 1,4-butanediol (Alfa Aesar, Ward Hill, Mass.) and p-nitrophenol (J. T. Baker, Phillipsburg, N.J.) were used without further purification. Pluronic F127 (Mw=12600), F68 (Mw=8700) and acryloyl chloride were purchased from Aldrich Chemical Company (Milwaukee, Wis.) and used without further purification.

Triethylamine from Fisher Scientific (Fairlawn, N.J.) was dried by refluxing with calcium hydride, and then distilled. Solvents like toluene, ethyl acetate, acetone, 2-propanol and dimethyl sulfoxide (DMSO) were purchased from VWR. Scientific (West Chester, Pa.) and were purified by standard methods before use. Initiator Irgacure 2959, Contains: 2-hydroxy-1-[4-(hydroxyethoxy]phenyl]-methyl-1-propanone were obtained from Ciba Specialty Chemicals Inc. Other chemicals and reagents if not otherwise specified were purchased from Sigma (St, Louis, Mo.).

6.1.4 Methods of Synthesis of Polymers and Hydrogels

Synthesis of Saturated and Unsaturated Arg-PEAs

Saturated Arg-PEAs (SArg-PEAs) were synthesized as described in Section 5.2. The amount of p-toluenesulfonic acid was doubled for the synthesis of p-toluenesulfonic acid salt of arginine diester compared, with the regular synthesis of p-toluenesulfonic acid salt of hydrophobic amino acids diesters.

The general scheme of the synthesis of SArg-PEA and UArg-PEA polymers is shown in FIGS. 20-21 and 23. FIG. 20 (steps 1a and 1b) shows the preparation of di-p-nitrophenyl ester of dicarboxylic acids. FIG. 21 (steps 2a and 2b) shows the preparation of tetra-p-toluenesulfonic acid salts of bis(L-arginine), α,ω-alkylene diesters.

Synthesis of Di-p-Nitrophenyl Esters of Dicarboxylic Acids (FIG. 20)

Di-p-nitrophenyl esters of dicarboxylic acids were prepared by reacting dicarboxylic acyl chloride varying in methylene length (x) with p-nitrophenol using methods shown in FIG. 20. Four monomers were made: di-p-Nitrophenyl Succate (NSu), x=2; di-p-Nitrophenyl Adipate (NA), x=4; di-p-Nitrophenyl Sebacate (NS), x=8; di-p-Nitrophenyl Fumarate (NF), x=2.

For example, di-p-nitrophenyl Succinate (NSu) was prepared in a 68% yield by the interaction of succinyl chloride (0.03 mol, 3.2 mL) with p-nitrophenol (0.0603 mol) in acetone in the presence of triethylamine (0.063 mol). An ice/water mixture was prepared to keep the p-nitrophenol and triethylamine mixed acetone solution (100 mL) at 0° C. Succinyl chloride was diluted in 50 mL of acetone before being added dropwise to the above chilled solution with stirring for 2 h at 0° C. and overnight at room temperature. The resulting di-p-nitrophenyl ester of succinic acid was precipitated in distilled water and dried in vacuo at room temperature before final recrystallization from ethyl acetate three times.

Synthesis of Tetra-p-Toluenesulfonic Acid Salt of Bis(L-arginine) Alkylene Diesters (FIG. 21)

The amount of p-toluenesulfonic acid was doubled with respect to the regular hydrophobic amino acid based diester monomer synthesis known in the art and discussed above.

Four monomers were made in which y is the number of methylene groups: tetra-p-toluenesulfonic acid salt of bis(L-arginine) ethane diesters Arg-2-S, y=2; tetra-p-toluenesulfonic acid salt of bis(L-arginine) propane diesters, Arg-3-S, y=3; tetra-p-toluenesulfonic acid salt of bis(L-arginine) butane diesters, Arg-4-S, y=4; di-p-toluenesulfonic acid di-hydrochloride acid salt of bis(L-arginine) propane diesters, Arg-3-S—Cl, y=3. The difference between Arg-3-S and Arg-3-S—Cl is the counterion attached on the guanidine group of arginine in the PEA; the former is toluenesulfonic ion and the latter is chloride ion.

For example, in the synthesis of toluenesulfonic acid salt of arginine diester, Arg-3-S, L-arginine (0.02 mol) and 1,3-propanediol (0.01 mol) were directly condensed in refluxed toluene (d.p. 110° C.) (80 ml) in the presence of p-toluenesulfonic acid monohydrate (0.04 mol). The heterogeneous solid-liquid reaction mixture was heated to 120° C., refluxed for 24 hr after 1.08 ml (0.06 mol) of water was generated and collected by a dean-stark apparatus. The reaction mixture was then cooled to room temperature. Toluene was decanted. The resulting dried mixture was then purified by repeated precipitation in 2-propanol three times. The resulting dried mixture was placed in a 500 ml round bottom flask filled with sufficient amount of 2-propanol to completely dissolve the reaction mixture with refluxing at 100° C. The clear solution was then cooled to room temperature naturally, and left still overnight before being transferred to a freezer to promote further precipitation. 2-propanol was decanted afterwards, and the remaining white sticky mass was dried in vacuo. The final product was a powder obtained in nearly quantitative yields (~90%). The scheme is shown in FIG. 21.

For di-p-toluenesulfonic acid di-hydrochloride acid salt of arginine diester, the starting arginine monomer used was L-arginine hydrochloride instead of L-arginine. Since the counterion Cl' is already attached to the arginine monomer, only a 1:1 ratio of p-toluenesulfonic acid to arginine HCl is needed. All other steps are as described above.

Synthesis of Saturated and Unsaturated Arg-PEA Polymers by Solution Condensation Saturated and unsaturated arginine-based PEAs were prepared by solution polycondensation of the above eight monomers (Arg-2-S, Arg-3-S, Arg-4-S, Arg-3-S—Cl and NSu, NA, NS and NF). Characteristics of exemplary synthesized polymers are summarized in Table 1.

For example, synthesis of 8-Arg-3-S via solution polycondensation was as follows. Monomers NS (1.0 mmol) and Arg-3 (1.0 mmol) in 0.54 mL of dry DMSO were mixed well by vortexing. The mixture solution was slowly heated while vortexing to obtain a uniform mixture. Triethylamine (0.31 mL, 2.2 mmol) was added dropwise to the mixture while heating to 70° C. with vigorous stirring until the monomers were completely dissolved. The reaction vial was then maintained for 48 hrs at 70° C. in a thermostat oven without stirring. The resulting solution was precipitated in cold ethyl acetate, decanted, dried, re-dissolved in methanol and re-precipitated in cold ethyl acetate to further purify it. This purification was repeated twice before final drying in vacuo at room temperature.

TABLE 1

Polymers synthesized by different combinations of monomers

| Monomers | Polymers |
| --- | --- |
| NSu + Arg-2-S | 2-Arg-2-S |
| NSu + Arg-3-S | 2-Arg-3-S |
| NA + Arg-3-S | 4-Arg-3-S |
| NA + Arg-4-S | 4-Arg-4-S |
| NS + Arg-3-S | 8-Arg-3-S |
| NS + Arg-4-S | 8-Arg-4-S |
| NF + Arg-2-S | 2U-Arg-2-S |
| NF + Arg-3-S | 2U-Arg-3-S |
| NF + Arg-4-S | 2U-Arg-4-S |
| NF + Arg-3-Cl | 2U-Arg-3-S-Cl |

Synthesis of Unsaturated Arginine-Based Poly(ester-amide)s (UArg-PEAs)

Unsaturated arginine-based poly(ester-amide)s (UArg-PEAs) were synthesized as described above and shown in FIG. 22. Unsaturated diols or/and diacids were used to make UArg-PEAs, whereas saturated diols or/and diacids were used to make the SArg-PEAs described above. The three synthesized UArg-PEAs are summarized in Table 2 and were used as precursors for fabricating UArg-PEA hydrogels and pluronicDA/UArg-PEA hybrid hydrogels.

TABLE 2

UArg-PEAs synthesized as polymer precursors for hydrogel fabrication

| Monomer Combinations | Monomer Containing >C=C< | UArg-PEA Obtained |
|---|---|---|
| NF + Arg-2 | NF | 2U-Arg-2-S |
| NF + Arg-3 | NF | 2U-Arg-3-S |
| NF + Arg-4 | NF | 2U-Arg-4-S |

Synthesis of PluronicDA Polymers

PluronicDA polymers were synthesized by modifying the synthesis of poly(ethylene glycol) diacrylate (PEGDA) previously described by G. M. Cruise, D. S. Scharp, J. A. Hubbell, Biomaterials, 19:1287, 1998. Briefly, 12.6 g of F127 or 8.7 g of F68 were dissolved in 150 mL of benzene and heated to 45° C. with stirring until dissolved completely. After the solution was cooled to room temperature, triethylamine, at a concentration five times molar excess of each —OH group on the pluronic, was added to the pluronic solution. Then acryloyl chloride, also at a concentration five times molar excess of each —OH group on the pluronic, was added dropwise to the pluronic solution to form acrylate diesters of the pluronic. The mixture was stirred overnight at room temperature under nitrogen atmosphere. The insoluble triethylamine salts formed during the reaction were removed by filtration and the pluronicDA product was precipitated in 700 mL chilled hexane and collected by filtration. Further purification was performed, by redissolving in 20 mL of benzene and reprecipitating in 700 mL of chilled hexane twice. The pluronicDA polymer was finally dried for 24 hr in vacuo at room temperature and stored at 4° C. for future use.

6.1.5 Preparation of PluronicDA Based Hydrogels and UArg-PEA/PluronicDA Based Hybrid Hydrogels PluronicDA based hydrogels (100% pluronic acid) and hybrid hydrogels were prepared by photopolymerization (Tables 3, 4 and 5). PluronicDA/UArg-PEA hydrogels were prepared by photopolymerization of different weight ratios of two polymers, UArg-PEA and pluronicDA, with a small amount of water soluble initiator. A hybrid hydrogel was created as follows.

0.08 g of 2U-Arg-2-S and 0.32 g F68DA (20/80 weight ratio of 2U-Arg-2-S/F68DA) were added to a vial (Φ=25 mm) and dissolved in 2 mL of distilled water to form a clear homogeneous solution with light yellow color due to the existence of UArg-PEA. 0.02 g of photoinitiator Irgacure 2959, (5 wt % of total amount of polymers) was added to the polymer solution and dissolved completely by heating slightly. After the solution was irradiated by a long-wavelength UV lamp (365 nm, 16 W) for 1 hr at room temperature, the resultant hydrogel (Φ=25 mm an thickness≈4 mm) was removed and immersed in distilled water at room temperature for 48 hr to remove any residual chemical. Distilled water was replaced periodically. After this purification process, the hydrogel was soaked in distilled water to reach swelling equilibrium, then removed and dried in vacuo at room temperature for 48 hr before further characterization.

The gel fraction ($G_f$) of the hydrogel was defined by the following equation:

$$G_f = \frac{W_d}{W_p} \times 100\%$$

where $W_d$ is the weight of dry hydrogel and $W_p$ is the total feed weight of the two polymers and the photoinitiator.

6.1.6 Materials Characterization

FTIR Spectroscopy

In Fourier transform infrared (FTIR) testing, polymers (including three types of UArg-PEAs and two types of pluronicDA) were ground into powder, mixed with KBr at 1:10 weight ratio, and then compressed into KBr pellets. FTIR spectra were then obtained from a Perkin-Elmer Nicolet Magan 560 FUR spectrometer (Madison, Wis.) with Omnic software for data acquisition and analysis.

Swelling Kinetics Measurement

Swelling kinetics of hydrogels were measured for days at room temperature. Dry hydrogels were weighed and immersed in 15 mL of PBS buffer solution at room temperature for predetermined periods; they were then removed and weighted on balance after the surface water was gently blotted with filter paper. The swelling ratio was calculated according to the equation below:

$$Q = \frac{W_s - W_d}{W_d} \times 100\%$$

where $W_s$ is the weight of swollen hydrogel at time t and $W_d$ is the weight of dry hydrogel at t=0.

Mechanical Testing

Compressive mechanical testing of swollen hydrogels was conducted. The compressive moduli were calculated from the slope of the initial linear portion of the curve. Each type of hydrogel was tested for three repeats and their mean value was calculated with a standard deviation. The effect of the feed ratio of the hydrogel polymer precursors on compressive moduli of the swollen hydrogels was also examined.

SEM of Interior Morphology

Scanning electron microscope (SEM) was employed to analyze the interior morphological structure of hydrogels as a function of the polymer feed ratio. Cryofixation technique was used to observe the swollen hydrogel structure with minimal artifacts. An individual hydrogel was incubated in distilled water at room temperature to reach its swelling equilibrium. The hydrogel was then gently removed and immediately transferred into liquid nitrogen to freeze and retain the swollen structure. The sample was subsequently freeze-dried for 72 hr in a Virtis Freeze Drier (Gardiner, N.Y.) under vacuum at −50° C., and finally fixed on aluminum stubs and coated with gold for 40 s for SEM observation by a Hitachi S4500 SEM (Mountain View, Calif.).

In Vitro Drug Release Studies

The release of paclitaxel from paclitaxel-loaded pluronicDA/UArg-PEA based hydrogels was carried out in PBS buffer with or without trypsin (0.1 mg/mL). Drug-loaded hydrogel samples (small pellets) were put into a small vial containing 5 ml, trypsin PBS solution. The whole system was incubated at 37° C. with constant reciprocal shaking (ca. 100 rmp). Hydrogel samples were transferred every 24 hours to a new vial with 5 mL fresh trypsin PBS solution in order to maintain the enzymatic activity.

To determine the release amount of the drug, 5 mL of acetonitrile was added to the 5 mL collected release medium. The solution was thoroughly vortexed to completely dissolve all the paclitaxel in the solution. Drug content was then analyzed by high performance liquid chromatography (HPLC) using an HP 1100 model (Hewlett-Packard, Palo, Alto, Calif., USA) equipped with a diode array detector. A C18 reversed phase column (5 µm, 4.6×250 nm, Alltech Adsorbosphere XL) was used as stationary phase, while the mobile phase consisted of acetonitrile and water in the volume ratio 60:40. The injection volume was 20 µL or 40 µL based on the released drug available and the mobile phase flow was maintained at 227 nm with a UV detector. ChemStation (Palo, Alto, Calif., USA) software was used for data analysis. All in vitro release sampling was carried out in triplicate and variation was expressed as standard error of the mean.

6.1.7 Results and Discussion

A series of biodegradable hydrogels was synthesized by UV photopolymerization of UArg-PEA and pluronicDA polymers with Irgacure 2959 as the initiator. The properties of these hydrogels, such as compression moduli, swelling behavior and interior morphology, were examined and their dependence on the chemical structure of UArg-PEA and polymer feed ratio were also examined.

UArg-PEA/PluronicDA Based Hydrogel Formulation

Three types of Arg-PEA polymers were synthesized and used to photocrosslink with pluronicDA by UV irradiation and form hydrogels. FIG. 1 shows the chemical structure of the three types of UArg-PEA (2U-Arg-y-S), where y=2, 3, 4 correspond to, 2U-Arg-2-S, 2U-Arg-3-S, and 2U-Arg-4-S.

FIG. 2 shows the chemical structures of three types of UArg-PEA and pluronicDA.

Both UArg-PEA and pluronicDA polymers are water soluble. The UArg-PEAs have the >C=C< double bonds imbedded in the backbone, so they can crosslink with the pluronicDA by UV irradiation. A crosslinking scheme is shown in FIG. 3

FTIR Spectroscopy peak of the unsaturated ester C=O bond (acrylate, ~1725 cm$^1$) was not seen with the original pluronic polymer, but was seen with pluronicDA polymer, which indicates the successful acrylation of pluronic polymers.

Swelling Kinetics Measurement and Mechanical Testing

Tables 3 and 4 show the effect of feed ratio of hydrogel polymer precursors on the properties of a series of F68DA/UArg-PEA based hybrid hydrogels. The gel fraction ($G_f$) of the hybrid hydrogels was lower than that of pure F68DA hydrogel when the UArg-PEA was 20% of the total weight, but was about the same when their weight percentage was dropped to 10% as in Table 4. An even lower $G_f$ can be predicted when the percentage of UArg-PEA is higher than 20%. This is mainly due to the less accessible double bonds on the UArg-PEA backbone and lower reactivity than those double bonds on the F68DA backbone.

The swelling ratio at equilibrium ($Q_{eq}$) increased with the increased methylene chain length in UArg-PEA (from 2U-Arg-2-S to 2U-Arg-4-S) because 2U-Arg-4-S has the lowest crosslinking density, and therefore bigger holes or larger spaces for storing water inside of the hydrogel. The compressive modulus was the lowest for 2U-Arg-4-S for the same reason.

When comparing F127DA and F68DA, it was found that F68DA was swollen more than F127DA due to its higher hydrophilicity in spite of the higher crosslinking density.

FIG. 5 demonstrates the swelling ratio of F127DA and F68DA overtime. First, the swelling reaches equilibrium in about 10 hours. Second, F68DA swells more than F127DA, which confirms the conclusion from Table 4.

TABLE 3

Formulation and properties of 80/20 pluronic DA/UArg-PEA based hydrogels

| | Sample | Weight Ratio | $G_f$(%) | $Q_{eq}$(%) |
|---|---|---|---|---|
| 20% w/v polymer | F68DA | 100:0 | 88 | 1144 ± 17 |
| 5% w/w initiator | F68DA/2U-Arg-2-S | 80:20 | 77 | 1785 ± 74 |
| ~0.09 g/sample | F68DA/2U-Arg-3-S | 80:20 | 82 | 1843 ± 77 |
| | F68DA/2U-Arg-4-S | 80:20 | 79 | 2158 ± 98 |
| 20% w/v polymer | F127DA | 100 | 81 | 847 |
| 1% w/w initiator | F68DA | 100 | 85 | 958 |
| ~0.06 g/sample | | | | |

TABLE 4

Formulation and properties of 90/10 pluronicDA/UArg-PEA based hydrogels-2

| | Sample | Weight Ratio | Diameter (mm) | $G_f$ (%) | Compressive Modulus at Break(×10−3 MPa) |
|---|---|---|---|---|---|
| 20% w/v polymer | F68DA/2U-Arg-2-S | 90:10 | 17.2 | 90 | 10.9 |
| | F68DA/2U-Arg-3-S | 90:10 | 18.0 | 90 | 10.6 |
| 5% w/w initiator | F68DA/2U-Arg-4-S | 90:10 | 13.1 | 88 | 9.5 |
| ~0.09 g/sample | F68DA/2-Arg-2-S | 90:10 | 15.0 | 76 | 7.8 |
| | F68DA/4-Arg-8-S | 90:10 | 15.3 | 68 | 4.7 |
| 20% w/v polymer | F127DA | 100 | 15.4 | 88 | 10.75 |
| | F68DA | 100 | 16.7 | 89 | 12.45 |
| 1% w/w initiator | | | | | |
| ~0.06 g/sample | | | | | |

Images of Hydrogels Before and after Swelling

FIG. 6 shows the swelling of different F68DA/UArg-PEA based hydrogels. When the gels were dry, all the hydrogels had the same size, but after swelling in water, the gel size produced was in the same order as the length of the methylene chain in UArg-PEA, 2U-Arg-2-S to 2U-Arg-4-S. The gel was largest when 2U-Arg-4-S was in the hybrid hydrogel and smallest with F68DA alone.

Swelling Behaviors of Hydrogels as a Function of Temperature

Tri-block copolymer pluronics self-associate to form micelles in aqueous solutions in dilute condition. At high concentrations above ca. 20% (w/v), tri-block copolymers pluronics exhibit thermoresponsive sol-gel transition behavior. The thermoresponsive property of pluronic hydrogels can be attributed, to a lower critical solution temperature (LCST) behavior that is mainly caused by a delicate balance of hydrophilic and hydrophobic moieties on the polymer structure. The LCST is closely related to critical micelle temperature (CMT) in pluronic copolymers. Highly concentrated pluronic copolymer solution instantaneously turns into a thermo-setting gel state upon increasing the temperature above the LCST by the formation of closely packed spherical micelles (Jun Bae Lee, Jun Jin Yooni, Doo Sung Lee, Tae Gwan Park. Photo-crosslinkable, thermo-sensitive and biodegradable pluronic hydrogels for sustained release of protein, J. Biomater. Sci. Polymer Edn, 2004; 15(12); 1571-1583). The semi-solidified gel structure formed above the CMT, however, loses its structural integrity upon dilution with other aqueous fluids, due to an immediate decrease in the copolymer concentration required for the close packing of pluronic micelles. Creating a UV induced crosslinking network, in the pluronic copolymer system will prevent this loss of structural integrity, while the thermal sensitivity is maintained.

As shown in FIG. 7, all pluronicDA based hydrogels and pluronicDA/UArg-PEA based hybrid hydrogels had thermal responsiveness. The swelling ratio monotonically decreased with increasing temperature, suggesting that the entrapped thermoresponsive pluronic micelles played a critical role in controlling the swelling ratio. The swelling ratio changed broadly over a wide range of temperature, from 6° C. to 70° C. Typically, a pluronic F127 solution with 25% (w/v) concentration shows a sol-gel transition around 20° C. (M. Malmsten and B. Lindman, Self-Assembly in Aqueous Block Copolymer Solutions, Macromolecules 25, 5440 (1992), which can also be confirmed from FIG. 7, at the point of the sudden drop of the F127DA curve.

Pluronic hydrogels exhibited a semireversible swelling/deswelling behavior as temperature was cycled between 4° C. and 37° C. (FIGS. 8-9). This was due to the thermoresponsive association, and dissociation, of hydrophobic PPO blocks within the core of micelles surrounded by the polymerized chain network. F127DA hydrogel showed the highest extent of swelling because of its higher hydrophobicity and looser crosslinking density, which provides more space for swelling than provided by the F68DA hydrogel. The F68DA/UArg-PEA based hydrogel had less thermal responsiveness than the F68DA hydrogel.

Interior Morphology of F68DA/UArg-PEA Hydrogels

FIG. 10 shows SEM images of the interior of F68DA and F68DA/U Arg-PEA based hybrid hydrogels. All the hybrid hydrogels had larger pore sizes or looser structures than, did pure F68DA hydrogel, which can be attributed to less reactivity of the double bond on UArg-PEA. The double bond requires a longer time to become fully crosslinked. When full crosslinking was achieved, however, the network structure became condensed and lost its response to water to a large degree, behaving more like a piece of film rather than a hydrogel (data not shown).

In Vitro Paclitaxel Release

FIG. 11 shows the hydrogels loaded with paclitaxel after 7 days. The paclitaxel particle can be clearly seen through the hydrogel, F127DA released much faster than F68DA and F68DA/2U-Arg-3-S (90/10), since F127DA has longer molecular chain and therefore a looser crosslinking structure. The effect of UArg-PEA in the hydrogel can be seen in FIG. 12, the release pattern over three months. As can be seen, R3>R4>R1>R2 Arg-PEAs did not show any tendency toward the trypsin-catalyzed hydrolysis, and the hydrolysis of Arg-PEA occurred at a very similar rate with trypsin-added hydrolysis. Trypsin catalyzed hydrolysis did not show prominent effect on the Arg-PEA hydrolysis. The hydrophilicity of guanidine group, and therefore the lack of sufficient interaction with the enzyme's hydrophobic pocket were suggested to be responsible for this finding.

DNA Release

Plasmid DNA was encapsulated in hydrogels during UV crosslinking. In order to retain the bioactivity of DNA, the duration of exposure to UV could not be too long, and therefore the F127DA/2U-Arg-2-S hydrogel did not reach full crosslinking and had a loose structure, which caused a faster release pattern than F127DA. There are two factors which may contribute to this pattern: hydrolysis of 2U-Arg-2-S, and the positive charge of arginine on 2U-Arg-S. The former will lead to a faster release, while the latter is expected to hold DNA. The fast hydrolysis played a major role here. The fester release from F68DA than from F127DA may come from its higher hydrophilicity. FIG. 13 summarizes the results of DNA release by different hydrogels.

6.1.8 Conclusions

Cationic, thermoresponsive and biodegradable hydrogels based on pluronic F127 and F68 triblock copolymers and arginine-based unsaturated poly(ester amide)s were prepared by UV-induced photo-polymerization. Di-acrylated pluronic polymer was synthesized and crosslinked in a micellar gel state. These hydrogels exhibited thermoresponsive swelling behavior in an aqueous solution over a wide range of temperature. This was because the inner core structure of pluronic micelles entrapped within a photo-crosslinked polymer network sensitively responded to temperature. Semi-reversible swelling/deswelling behaviors were observed during thermal cycles between 10° C. and 37° C. in a short incubation period. The ester linkage located at the junctions of pluronic micelles to crosslinked polymer network was slowly cleaved by hydrolysis, making these hydrogels biodegradable. Close linear release profiles from photo-crosslinked pluronic/UArg-PEA based hydrogels were observed. Hydrogels having greater amounts of hydrophobic polymer component were observed to release the hydrophobic drug paclitaxel more rapidly. Hydrogels having greater amounts of hydrophilic polymer component were observed to release the hydrophilic plasmid DNA more rapidly.

These in situ forming photo-crosslinked and biodegradable pluronic/UArg-PEA based hydrogels are therefore useful for achieving sustained release of different ionic drugs.

6.2 Example 2

Sustained Release of Interleukin-12 by PluronicDA Based and Hybrid PluronicDA/UArg-PEA Based Hydrogels

6.2.1 Summary of the Example

Pluronics are ABA-type triblock copolymers composed of a central hydrophobic polypropylene oxide section with two hydrophilic polyethylene oxide sections of equal length, at either end. The two ends of pluronic polymers were grafted double bonds to endow the crosslinking ability. Arginine-based unsaturated poly(ester-amide)s are a new group of water soluble polymers with ester, amide and L-arginine blocks in the backbone. This example describes the synthesis of hydrogels based on these two polymers by UV crosslinking. The suitability of the hydrogels to provide sustained interleukin-12 (IL-12) delivery for cancer immunotherapy was then tested. This example demonstrates that pluronicDA based hydrogels and pluronicDA/UArg-PEA based hydrogels release IL-12 over 79 days in vitro. Polymer structure and release pattern relationships were studied, and hydrophilicity, positive charge and less crosslinking density were found to favor IL-12 release.

6.2.2 Introduction

According to IARC-WHO estimates, cancer rates are set to increase globally at an alarming rate (Mignogna MD, P. S., Russo L Lo., The World Cancer Report and the burden of oral cancer. European journal of Cancer Prevention 2004, 13, 139-142). Most cancers are detected at a late stage, and conventional therapies (surgery, radiation and chemotherapy) are unsatisfactory in term of eradication. Therefore, development of a new therapeutic modality is needed.

Different parenteral cytokine regimens have been established as effective anti-tumor therapeutic modalities in pre-clinical research. Translation of this approach to clinical practice has been hampered by the morbidities associated with the current method, of systemic cytokine administration. To overcome this limitation, local delivery (expression or release) of cytokines into the tumor milieu has been attempted using various techniques. A variety of cytokines Including IL-22, 3, IL-63, IL-74, IL-125-7, IFNγ8, and TNFα9 have been found to be effective when this strategy is used for tumor eradication. It has also been observed that intra-tumoral cytokine immunotherapy not only suppressed primary tumor growth, but also eliminated remote foci of tumor and metastasis (Addison C I., B, J., Hitt M M, Muller W J, Gauldie J, Graham F L., Intratumoral connection of adenoviral vectors expressing IL-2 and IL-12 results in enhanced frequency of regression of injected and untreated distal tumors. Gene Therapy 1998, 5, 1400-9; Mazzolini G, Q. C, Xie X, Sun Y, Lasarte J J, Drozdzik M, Prieto J., Regression of colon cancer and induction of antitumor immunity by intratumoral injection of adenovirus expressing interleukin-12. Cancer Gene Therapy 1999, 6, 514-22; Nasu Y, B. C, Hull G W, Lee H M, Hu J, Wang J, McCurdy M A, Shimura S, Yang G, Timme T L, Thompson T C, Adenovirus-mediated interleukin12 gene therapy for prostate cancer: suppression of orthotopic tumor growth and pre-established lung metastases in an orthotopic model. Gene Therapy 1999, 6, 338-49).

Furthermore, intra-tumoral cytokine immunotherapy also helped the host to reject the same tumor upon re-challenge (Miller P W, S. S., Stolina M, Butterfield L H, Luo J, Lin Y, Dohadwala M, Batra R K, Wu L, Economou J S, Dubinett S M., Intratumoral administration of adenoviral interleukin 7 gene-modified dendritic cells augments specific antitumor immunity and achieves tumor eradication. Human Gene Therapy 2000, 11, 53-65; Mazzolini G, Q. C, Xie X, Sun Y, Lasarte J J, Drozdzik M, Prieto J., Regression of colon cancer and induction of antitumor immunity by intratumoral injection of adenovirus expressing interleukin-12. Cancer Gene Therapy 1999, 6, 514-22; Mendiratta S K, Q. A., Matar M, Wang J, Hebel H E, Long S, Nordstrom J L, Pericle F., Intratumoral delivery of IL-12 gene by polyvinyl polymeric vector system to murine renal and colon carcinoma results in potent antitumor immunity. Gene Therapy 1999, 6, 833-9: Nomura T, Y. K., Yamada T, Okamoto S, Mahato R I, Watanabe Y, Takakura Y, Hashida M., Gene expression and antitumor effects following direct interferon (IFN)-gamma gene transfer with naked plasmid DNA and DC-chol liposome complexes in mice. Gene Therapy 1999, 6, 121-9. Wright P, B. R., Babiuk L, Littel-van den Hurk S D, Moyana T, Zheng C, Chen Y, Xiang J., Adenovirus-mediated TNF-alpha gene transfer induces significant tumor regression in mice. Cancer Biotherapy & Radiopharmaceuticals 1999, 14, 49-57; Putzer B M, H. M., Muller W J, Emtage P, Gauklie J, Graham F L., Interleukin 12 and B7-1 costimulatory molecule expressed by an adenovirus vector act synergistically to facilitate tumor regression. Proceedings of the National Academy of Sciences of the United States of America 1997, 94, 10889-94) confirming that the local administration strategy can stimulate systemic protective anti-tumor immunity.

Conventional encapsulated delivery systems, such as liposomes and microspheres, present certain drawbacks as potential cytokine carriers owing to unfavorable releasing kinetics (not long enough, usually days to weeks; inability to control release kinetics; usually with a large portion early peak burst) and loss of bioactivity owing to harsh physical conditions (such as high temperature, sonication, etc.) and to the organic solvent used in their preparation.

In this study, we characterized the biodegradable hydrogel as a carrier system to deliver bioactive cytokines directly into the tumor microenvironment, thus achieving anti-tumor activity and bypassing inhibitory systemic side-effects. Various hydrogel formulations have been characterized in terms of in vitro release kinetics and capability of bioactivity preservation.

The hydrogel series was made of raw materials that are FDA-approved and widely used in clinical practice: pluronic polymers and biodegradable, ionic, arginine-based poly(ester-amide)s. In addition to safety, biocompatibility, versatility and simplicity, the wide variety of hydrogel components (various pluronic and UArg-PEA polymers) and parameters (molecular weight, composition ratio, type and degree of crosslinking) allows engineering of hydrogels with a wide range of cytokine release kinetics. Hydrogels can be prepared with a simplified procedure of "photo-curing", thus avoiding "encapsulation", which is a major factor responsible for loss of bioactivity. These hydrogels can be formulated in an aqueous environment, thus avoiding organic-sol vents, another limiting factor of other polymer-based carrier systems.

Pluronic polymers (or poloxamers) belong to a class of polymeric surfactants that possess the ability to interact with biological membranes. They are a family of coblock polymers composed of polyethylene oxide (PEG) and polypropylene oxide (PPO), where PPO provides the central hydrophobic core where the methyl groups are believed to interact with the hydrophobic substance to be solubilized. The PEO blocks confer water solubility to the polymer, although the hydrogen-bonding interactions of the ether oxygen with water molecules probably tend to occur all along the chain (Schmolka, I. R., Review of Block Polymer Surfactants. Journal of the American Oil Chemists Society 1977, 54, (3), 110-116).

Poloxamers are classified by a three-digit numerical naming system where the first two digits multiplied by 100 give the approximate molecular weight of the hydrophobe, and the last digit multiplied by 10 gives the percent hydrophile (by molecular weight). In North America, they are also known as pluronics, where the preceding letters F, P, or L denotes on whether the polymer is in flake, paste or liquid form. Poloxamers are not metabolized by the body and are renally excreted. They are considered to be inert materials and are listed in the Food, and Drug Administration (FDA) inactive ingredients list. Poloxamers also demonstrate lower critical solubility temperature (LCST) at physiological temperatures. The most commonly used poloxamers are F127 and F68 are known to undergo thermal gelation at physiological temperatures (Nystrom, B.; Walderhaug, H., Dynamic viscoelasticity of an aqueous system of a poly(ethylene oxide)-poly(propylene oxide)-poly(ethylene oxide) triblock copolymer during gelation. Journal of Physical Chemistry 1996, 100, (13), 5433-5439; Malmsten, M.; Lindman, B., Self-Assembly in Aqueous Block Copolymer Solutions. Macromolecules 1992, 25, (20), 5440-5445).

Arginine-based poly(ester amide)s (UArg-PEAs) are polymers with both ester and amide blocks on their backbones. They are water soluble, biodegradable and possess unique positive charge due to the L-arginine component.

Determination and evaluation of formulation content, formulation methods, stability under different storage conditions and the use of different reconstitution media was as follows.

6.2.3 Materials

Pluronics with MW 8400 and 80% PEG content (F68) and MW 12 600 and 70% PEG content (F127), were purchased from Sigma and used as received. Acryloyl chloride was distilled under nitrogen atmosphere over quinoline. Triethylamine was distilled under nitrogen atmosphere and stored over potassium hydroxide.

Water soluble UV initiator Irgacure 2959 Contains; 2-hydroxy-1-[4-(hydroxyethoxy]phenyl]-2-methyl-1-propanone (Cbia).

L-Arginine (L-Arg), p-toluenesulfonic acid monohydrate, sebaeoyl chloride, adipoyl chloride, ethylene glycol, 1,3-propanediol, 1,4-butanediol (Alfa Aesar, Ward Hill, Mass.) and p-nitrophenol (J. T. Baker, Phillipsburg, N.J.) were used without further purification. Triethylamine from Fisher Scientific (Fairlawn, N.J.) was dried by refluxing with calcium hydride, and then distilled. Solvents such as toluene, ethyl acetate, acetone, 2-propanol and dimethyl sulfoxide (DMSO) were purchased from VWR Scientific (West Chester, Pa.) and were purified by standard methods before use.

Other chemicals and reagents, if not otherwise specified, were purchased from Sigma (St. Louis, Mo.).

6.2.4 Materials Characterization

1H NMR spectra were recorded on a 300 MHz Broker spectrometer. FT-IR spectra were recorded in ATR mode on a Spectrum One Perkin Elmer spectrometer. GPC was performed in tetrahydrofuran on a Polymer Laboratories GPC equipped with refractive index and evaporative light scattering detectors; the Mn data were obtained using a universal calibration with PEG standards.

6.2.5 Methods of Synthesis of Polymer Precursors for Hydrogels

Synthesis of Pluronic F127 Diacrylate (F127DA) and F68 Diacrylate (F68DA)

25 g of F127 (2.08 mmol) were dissolved in benzene under nitrogen atmosphere and dried by refluxing the solvent through a Soxhlet extractor filled with activated molecular sieves. After 4 h, the solution was cooled slowly to room temperature and then to 0° C. with an ice bath. In a dropping funnel were introduced first 1.2 mL of triethylamine (8.63 mmol, 2 equiv. per OH group), then 20 mL of dichloromethane, and finally 0.5 of freshly distilled acryloyl chloride (6.24 mmol, 1.5 equiv. per OH group) diluted in 20 ml, of dichloromethane. The mixture was stirred for 12 h, then the precipitated triethylammonium chloride was filtered away and the solvent evaporated with a rotary evaporator. The resulting viscous oil was dissolved in dichloromethane, washed with water, dried over sodium sulfate and finally precipitated in cold diethyl ether. Conversion 100% (from 1H NMR data). Yield 80%. FT-IR: 2 990-2 790 (n C_H), 1 724 (n C—O), 1 467 (ds CH2), 1 342, 1 279, 1 242, 1 097 (nas C_O_C), 962, 841 (ns C_O_C) cm_1. 1H NMR (CDCl3): d ¼ 1.1 (m, 190H, PPG methyl group 63 monomeric units), 3.4 (m, 63H, PPG methine group 63 monomeric units), 3.5 (m, 124H, PPG methylene group 62 monomeric units), 3.65 (m, 818H, PEG chain protons ¼ 204 monomeric units), 4.3 (t, 2H, _CH2_CH2_O_O_CO_CH—CH2), 5.8 (dd, 2H, CH2-CH_COO_), 6.15 and 6.4 (both dd. Scheme 1, FIG. 20. 2H, CH2-CH_COO_).

Synthesis of Arginine-Based Unsaturated Poly(Ester-Amide)s

Synthesis of arginine-based unsaturated poly(ester-amide)s (UArg-PEAs) was carried out as described above in Section 6.1.

6.2.6 In Vitro Cytokine Release Assay

IL-12 loaded BH (10 mg of dry BH) was immersed in 500 µl of DMEM at 37° C. for up to 90 days in 24-well tissue culture plate, immersing medium was harvested and replaced every day. Harvested medium was quantified for IL-12 immunologically using a sandwich-ELISA. The raw release data obtained was used to construct release kinetics profiles. At least duplicates of each sample were tested for averaging. Free cytokines (with no BH) were used as controls to evaluate spontaneous reduction, if any, over time under the same conditions,

6.2.7 Quantification of Released IL-12 (Sandwich ELISA)

IL-12-specific sandwich ELISA was used to quantify IL-12 released from the hydrogel. Briefly, microtiter plates were coated with capturing antibody (M122, Endogen Inc., Philadelphia, Pa.). Coated plates were sealed and placed in a refrigerator overnight. After quenching, plates were incubated with target-cytokine-standard or testing sample along with biotinylated detecting antibody (M121-B, Endogen Inc.) at room temperature for 2 hours followed by stepwise incubation with avidin-horseradish peroxidase and the TMB substrate. Finally, dual wavelength (450 nm-540 nm) absorbance will be measured by an ELISA reader. The sensitivity of these ELISA assays is about 5-20 pg/ml.

6.2.8 Results and Discussion

Several types of polymers can be used. Pluronic F-68 and F-127 were functionalized with acrylic groups by direct reaction with acryloyl chloride. The acrylates (F68DA and F127DA) were then used as hydrogel precursors.

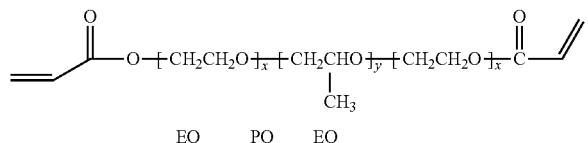

EO   PO   EO

General Structure of Pluronic Polymer pluronic F68da $EO_{78}$-$PO_{30}$-$EO_{78}$ 80% weight from EO MW=8400 HLB-29 pluronic F127da $EO_{100}$-$PO_{65}$-$EO_{100}$ 70% weight from EO MW=12600 HLB-22

(HLB=Hydrophilic-Lipophilic-Balance). F68da is more hydrophilic and has higher crosslinking density than F127DA because of its shorter chain length between two double bonds.

Unsaturated Poly(ester amide) (PEA): 2U-Arg-2, 2U-Arg-3 and 2U-Arg-4, simplified as 2UA2, 2UA3 and 2UA4

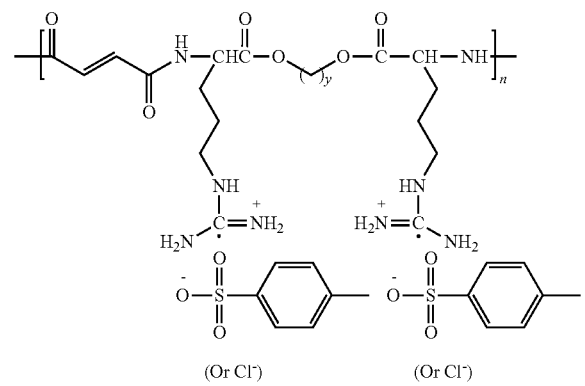

Formula (I). General Chemical Structure of Arginine-Based Unsaturated Poly(Ester-Amide).

The full structure name is 2U-L-Arg-y-S, where y is the number of methylene group between two ester groups, and y=2, 3, and 4 in this study. U stands for an unsaturated structure. The crosslinking of the hydrogel takes place on these unsaturated double bonds. A larger y indicates lower arginine charge density and higher hydrophobicity.

Table 5 is a summary of pluronicDA based hydrogels and pluronicDA/UArg-PEA based hydrogels tested for interleukin-12 release.

TABLE 5

| Sampling Number | Polymer Formulation (20% w/v) | Weight ratio | Initiator % (wt %) |
|---|---|---|---|
| 1 | F68DA | 100 | 5 and 1 |
| 2 | F127 DA | 100 | 5 and 1 |
| 3 | F68 DA/2U-A-3 | 80/20 | 5 and 1 |
| 4 | F68 DA/2U-A-3 | 20/80 | 1 |
| 5 | F68 DA/2U-A-3 | 50/50 | 1 |
| 6 | F68 DA/2U-A-3 | 80/20 | 1 |
| 7 | F68 DA/2U-A-2 | 50/50 | 1 |
| 8 | F68 DA 2U-A-3 | 50/50 | 1 |
| 9 | F68 DA/2U-A-4 | 50/50 | 1 |

The following comparisons can be used to summarize the results. From these comparisons, the polymer with the best releasing behavior can be determined and the polymer structure-property relationship can be understood.

Effect of Hydrophilicity on IL-12 Release Pattern

F68DA hydrogels always released more than F127DA hydrogels. In the first month of release, F68DA released 3-5 times more than F127DA did, and about 2-3 times more thereafter. FIG. 14 shows this trend.

When, the initiator is 5% wt with respect to the polymer, with the addition of 2U-A-3 to F68DA, the hydrogel release amount was increased about 2-10 times more for about 20 days (FIG. 15). After that, release tended to level off.

When the initiator is 1% wt with respect to the polymer, hydrogels with 2U-A-3 released about 6-2 times than F68DA alone for up to 2 months, and then leveled off (FIG. 16).

For both F68DA and F68DA/2U-A-3 based hydrogels, 1% initiator samples always released 1-2 times more than 5% initiator samples. FIG. 17 illustrates the ratio of release amount of 1% initiator sample to that of 5% initiator sample.

Effect of Amount of Initiator on IL-12 Release Pattern

The general IL-12 release pattern for all the samples was as follows: burst release to some degree in the first several days, and then sustained consistent release of a small amount through the last day tested (up to 79 days). The difference in release amount between different samples diminished over lime.

FIG. 18 shows the effect of the amount of 2U-Arg-3 on IL-12 release pattern.

F68DA hydrogel released more than F127DA hydrogels, which can result from the higher hydrophilicity of F68da, but not crosslinking density, since F68DA has higher crosslinking density than F127DA. 80% of F68DA polymer weight comes from the ethylene oxide portion, which is hydrophilic, while 70% of F127DA polymer weight comes from the ethylene oxide portion. Hydrophilicity favoring IL-12 release can also be confirmed by the higher releasing amount of F68DA/2U-A-3 over F68DA. The 2U-A-3 PEA polymer has a positively charged arginine group, which is very hydrophilic, so the addition of 2U-A-2 to F68DA further increased the hydrophilicity of the hydrogel. On the other hand, the cationic 2U-A-3 might electrostatically interact with cationic IL-12. Positive charges on both 2U-A-3 and IL-12 residue will repel each other, and therefore lead to faster release of IL-12 from the 2U-A-3 hydrogel.

Hydrophilicity/positive charge and crosslinking density are two contradictory factors: higher hydrophilicity will favor release, but higher crosslinking density will retard release owing to the denser gel structure. When comparing the effect of 2U-A-2, 2U-A-3 and 2U-A-4, as the number of methyl group increases (from 2 to 4), the crosslinking density decreases. This explains why F68DA/2U-A-4 (50/50) has the highest release as shown in FIG. 19. When the amount of 2U-A-3 increase in the F68DA/2U-A-3 hybrid hydrogel, the release amount increases as well, owing to increasing hydrophilicity.

In summary, the release of IL-12 from hydrogel is controlled by four factors: diffusion, polymer degradation, interaction with polymer (charge or hydrophilicity) and hydrogel crosslinking density. At the beginning, IL-12 on the surface of hydrogel will be washed off, and the rest imbedded in the gel will either diffuse out or repel out by interaction with positive charges on the Arg-based-PEA polymer or the hydrophilic portion of the pluronic acid polymer. Both the Arg-based-PEA polymer and the pluronic polymer in the hydrogels will be degraded with time, but they degrade quite slowly due to the crosslinking structure.

Higher amount of initiator in hydrogel formulation will lead to higher crosslinking density or denser gel structure, and therefore 1% initiator samples release more than 5% initiator samples. Moreover, the unconsumed radicals from the initiator are known to damage IL-12, so smaller amounts of initiator sufficient to catalyze Initiation are preferred.

6.2.9 Conclusions

Both pluronicDA based and pluronicDA/UArg-PEA based hydrogels can sustain IL-12 release over almost three months. In some embodiments, F68DA and 1% initiator is preferred rather than F127DA and 5% Initiator. Hydrophilicity, positive charge, less crosslinking density will favor the IL-12 release. Care taken during the hydrogel formulation process can lead to more uniform samples and helps to reduce the burst release.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

All references cited herein are incorporated herein by reference in their entirety and for all purposes to the same extent as if each individual publication, patent or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

What is claimed is:

1. A hybrid hydrogel comprising a plurality of crosslinked polymers wherein the polymers prior to polymerization and crosslinking have a chemical formula described by:

the general structural Formula (I),

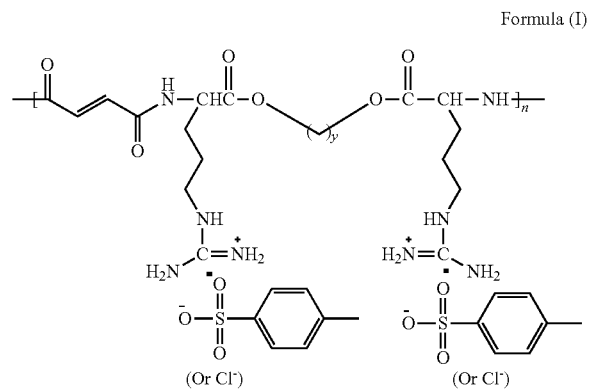

Formula (I)
wherein y=1-20 and n=5-600, and the general structural Formula (II),

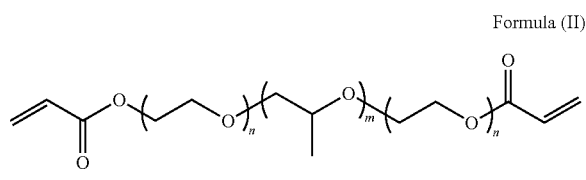

Formula (II)

wherein m=10-90 and n=1-150.

2. The hybrid hydrogel of claim 1 having thermoresponsive properties.

3. A method for controlling release of a molecule or compound comprising: providing the hydrogel of claim 1, wherein the molecule or compound is loaded in the hydrogel.

4. A method for directing release of a molecule or compound in an area of interest comprising:
providing the hydrogel of claim 1, wherein the molecule or compound is loaded in the hydrogel and wherein the hydrogel is inserted in the area of interest.

5. The method of claim 3 wherein the molecule or compound is a bioactive molecule or compound.

6. The method of claim 5 wherein the molecule or compound is a nutrient, pharmaceutical, drug, peptide, polypeptide, oligonucleotide or polynucleotide.

7. An apparatus for controlling release of a molecule or compound comprising the hydrogel of claim 1.

8. An apparatus for directing release of a molecule or compound in an area of interest comprising the hydrogel of claim 1.

9. The apparatus of claim 7 wherein the molecule or compound is a bioactive molecule or compound.

10. The apparatus of claim 9 wherein the molecule or compound is a nutrient, pharmaceutical, drug, peptide, polypeptide, oligonucleotide or polynucleotide.

11. The method of claim 4 wherein the molecule or compound is a bioactive molecule or compound.

12. The method of claim 11 wherein the molecule or compound is a nutrient, pharmaceutical, drug, peptide, polypeptide, oligonucleotide or polynucleotide.

13. The apparatus of claim 8 wherein the molecule or compound is a bioactive molecule or compound.

14. The apparatus of claim 13 wherein the molecule or compound is a nutrient, pharmaceutical, drug, peptide, polypeptide, oligonucleotide or polynucleotide.

* * * * *